(12) United States Patent
Liang et al.

(10) Patent No.: US 9,537,614 B2
(45) Date of Patent: Jan. 3, 2017

(54) METHOD FOR SENDING HYBRID AUTOMATIC REPEAT REQUEST ACKNOWLEDGEMENT MESSAGE AND USER EQUIPMENT

(75) Inventors: Chunli Liang, Shenzhen (CN); Bo Dai, Shenzhen (CN); Weiwei Yang, Shenzhen (CN); Lu Ren, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 764 days.

(21) Appl. No.: 14/362,474

(22) PCT Filed: Jul. 21, 2011

(86) PCT No.: PCT/CN2011/077448
§ 371 (c)(1),
(2), (4) Date: Sep. 3, 2014

(87) PCT Pub. No.: WO2012/088874
PCT Pub. Date: Jul. 5, 2012

(65) Prior Publication Data
US 2015/0085714 A1    Mar. 26, 2015

(30) Foreign Application Priority Data
Dec. 28, 2010   (CN) .......................... 2010 1 0611728

(51) Int. Cl.
*H04L 1/18* (2006.01)
*H04L 1/16* (2006.01)
(Continued)

(52) U.S. Cl.
CPC .......... *H04L 1/1893* (2013.01); *H04L 1/1614* (2013.01); *H04L 1/1861* (2013.01); *H04L 5/001* (2013.01); *H04L 5/0055* (2013.01); *H04L 5/1469* (2013.01)

(58) Field of Classification Search
None
See application file for complete search history.

(56) References Cited

U.S. PATENT DOCUMENTS

2010/0210256 A1* 8/2010 Shen ................... H04L 1/1614
455/422.1
2011/0235599 A1* 9/2011 Nam ................... H04L 1/0027
370/329

FOREIGN PATENT DOCUMENTS

CN  101478383 A  7/2009
CN  101795177 A  8/2010
(Continued)

OTHER PUBLICATIONS

3GPP TSG RAN WG1 Meeting #59bis, HS-DPCCH HARQ-ACK Design for 4C-HSDPA, Valencia, Spain, ZTE Corporation, Jan. 2010.
(Continued)

*Primary Examiner* — Huy D Vu
*Assistant Examiner* — James P Duffy
(74) *Attorney, Agent, or Firm* — Oppedahl Patent Law Firm LLC

(57) ABSTRACT

The disclosure discloses a method for sending a Hybrid Automatic Repeat Request Acknowledgement (HARQ-ACK) message in a Time Division Duplex (TDD) system and a User Equipment (UE), in order that the UE feeds back the HARQ-ACK message of each downlink serving cell and downlink subframe in Physical Uplink Control Channel (PUCCH) format 1b with channel selection in the TDD system. When there are more than 1 downlink subframes in a downlink subframe window corresponding to an uplink subframe, the feedback mode when the UE feeds back the HARQ-ACK message in format 1b with channel selection is determined through the configuration of the high layer or according to the result about whether the UE receives the (Continued)

Physical Downlink Shared Channel (PDSCH) from a secondary downlink serving cell. In feedback mode 1, the UE adopts the mapping table defined by Long Term Evolution Advanced (LTE-A) (Rel-10), generates the HARQ-ACK message in the mapping table by a time domain bundling method, and determines the corresponding PUCCH resources in the mapping table by a preset new PUCCH resource determining method.

17 Claims, 9 Drawing Sheets

(51) Int. Cl.
  *H04L 5/00* (2006.01)
  *H04L 5/14* (2006.01)

(56) References Cited

FOREIGN PATENT DOCUMENTS

| | | |
|---|---|---|
| CN | 101873706 A | 10/2010 |
| CN | 102098151 A | 6/2011 |
| EP | 2234308 A1 | 9/2010 |

OTHER PUBLICATIONS

International Search Report in international application No. PCT/CN2011/077448, mailed on Oct. 27, 2011.
English Translation of the Written Opinion of the International Search Authority in international application No. PCT/CN2011/077448, mailed on Oct. 27, 2011.

* cited by examiner

Fig. 1

| HARQ-ACK(0) | HARQ-ACK(1) | Channel index $n_{PUCCH,i}^{(1,p)}$ | $b(0)b(1)$ |
|---|---|---|---|
| ACK | ACK | $n_{PUCCH,1}^{(1)}$ | 1,1 |
| ACK | NACK/DTX | $n_{PUCCH,0}^{(1)}$ | 1,1 |
| NACK/DTX | ACK | $n_{PUCCH,1}^{(1)}$ | 0,0 |
| NACK | NACK/DTX | $n_{PUCCH,0}^{(1)}$ | 0,0 |
| DTX | NACK/DTX | No transmission | |

Fig. 2

| HARQ-ACK(0) | HARQ-ACK(1) | HARQ-ACK(2) | Channel index $n_{PUCCH,i}^{(1,p)}$ | $b(0)b(1)$ |
|---|---|---|---|---|
| ACK | ACK | ACK | $n_{PUCCH,1}^{(1)}$ | 1,1 |
| ACK | NACK/DTX | ACK | $n_{PUCCH,1}^{(1)}$ | 1,0 |
| NACK/DTX | ACK | ACK | $n_{PUCCH,1}^{(1)}$ | 0,1 |
| NACK/DTX | NACK/DTX | ACK | $n_{PUCCH,2}^{(1)}$ | 1,1 |
| ACK | ACK | NACK/DTX | $n_{PUCCH,0}^{(1)}$ | 1,1 |
| ACK | NACK/DTX | NACK/DTX | $n_{PUCCH,0}^{(1)}$ | 1,0 |
| NACK/DTX | ACK | NACK/DTX | $n_{PUCCH,0}^{(1)}$ | 0,1 |
| NACK/DTX | NACK/DTX | NACK | $n_{PUCCH,2}^{(1)}$ | 0,0 |
| NACK | NACK/DTX | DTX | $n_{PUCCH,0}^{(1)}$ | 0,0 |
| NACK/DTX | NACK | DTX | $n_{PUCCH,0}^{(1)}$ | 0,0 |
| DTX | DTX | DTX | No transmission | |

Fig. 3

| HARQ-ACK(0) | HARQ-ACK(1) | HARQ-ACK(2) | HARQ-ACK(3) | Channel index $n^{(1,p)}_{PUCCH,i}$ | $b(0)b(1)$ |
|---|---|---|---|---|---|
| ACK | ACK | ACK | ACK | $n^{(1)}_{PUCCH,1}$ | 1,1 |
| ACK | NACK/DTX | ACK | ACK | $n^{(1)}_{PUCCH,2}$ | 0,1 |
| NACK/DTX | ACK | ACK | ACK | $n^{(1)}_{PUCCH,1}$ | 0,1 |
| NACK/DTX | NACK/DTX | ACK | ACK | $n^{(1)}_{PUCCH,3}$ | 1,1 |
| ACK | ACK | ACK | NACK/DTX | $n^{(1)}_{PUCCH,1}$ | 1,0 |
| ACK | NACK/DTX | ACK | NACK/DTX | $n^{(1)}_{PUCCH,2}$ | 0,0 |
| NACK/DTX | ACK | ACK | NACK/DTX | $n^{(1)}_{PUCCH,1}$ | 0,0 |
| NACK/DTX | NACK/DTX | ACK | NACK/DTX | $n^{(1)}_{PUCCH,3}$ | 1,0 |
| ACK | ACK | NACK/DTX | ACK | $n^{(1)}_{PUCCH,2}$ | 1,1 |
| ACK | NACK/DTX | NACK/DTX | ACK | $n^{(1)}_{PUCCH,2}$ | 1,0 |
| NACK/DTX | ACK | NACK/DTX | ACK | $n^{(1)}_{PUCCH,3}$ | 0,1 |
| NACK/DTX | NACK/DTX | NACK/DTX | ACK | $n^{(1)}_{PUCCH,3}$ | 0,0 |
| ACK | ACK | NACK/DTX | NACK/DTX | $n^{(1)}_{PUCCH,0}$ | 1,1 |
| ACK | NACK/DTX | NACK/DTX | NACK/DTX | $n^{(1)}_{PUCCH,0}$ | 1,0 |
| NACK/DTX | ACK | NACK/DTX | NACK/DTX | $n^{(1)}_{PUCCH,0}$ | 0,1 |
| NACK/DTX | NACK | NACK/DTX | NACK/DTX | $n^{(1)}_{PUCCH,0}$ | 0,0 |
| NACK | NACK/DTX | NACK/DTX | NACK/DTX | $n^{(1)}_{PUCCH,0}$ | 0,0 |
| DTX | DTX | NACK/DTX | NACK/DTX | No transmission | |

Fig. 4

| HARQ-ACK(0) | HARQ-ACK(1) | HARQ-ACK(2) | HARQ-ACK(3) | Channel index $n^{(1,p)}_{PUCCH,i}$ | $b(0)b(1)$ |
|---|---|---|---|---|---|
| ACK | ACK | ACK | ACK | $n^{(1)}_{PUCCH,1}$ | 1,1 |
| ACK | NACK/DTX | ACK | ACK | $n^{(1)}_{PUCCH,3}$ | 1,1 |
| NACK/DTX | ACK | ACK | ACK | $n^{(1)}_{PUCCH,1}$ | 0,0 |
| NACK/DTX | NACK/DTX | ACK | ACK | $n^{(1)}_{PUCCH,3}$ | 0,1 |
| ACK | ACK | ACK | NACK/DTX | $n^{(1)}_{PUCCH,2}$ | 1,1 |
| ACK | NACK/DTX | ACK | NACK/DTX | $n^{(1)}_{PUCCH,2}$ | 1,0 |
| NACK/DTX | ACK | ACK | NACK/DTX | $n^{(1)}_{PUCCH,2}$ | 1,0 |
| NACK/DTX | NACK/DTX | ACK | NACK/DTX | $n^{(1)}_{PUCCH,2}$ | 0,0 |
| ACK | ACK | NACK/DTX | ACK | $n^{(1)}_{PUCCH,0}$ | 1,0 |
| ACK | NACK/DTX | NACK/DTX | ACK | $n^{(1)}_{PUCCH,0}$ | 0,1 |
| NACK/DTX | ACK | NACK/DTX | ACK | $n^{(1)}_{PUCCH,3}$ | 1,0 |
| NACK/DTX | NACK/DTX | NACK/DTX | ACK | $n^{(1)}_{PUCCH,3}$ | 0,0 |
| ACK | ACK | NACK/DTX | NACK/DTX | $n^{(1)}_{PUCCH,1}$ | 1,0 |
| ACK | NACK/DTX | NACK/DTX | NACK/DTX | $n^{(1)}_{PUCCH,0}$ | 1,1 |
| NACK/DTX | ACK | NACK/DTX | NACK/DTX | $n^{(1)}_{PUCCH,1}$ | 0,1 |
| NACK | NACK/DTX | NACK/DTX | NACK/DTX | $n^{(1)}_{PUCCH,0}$ | 0,0 |
| DTX | NACK/DTX | NACK/DTX | NACK/DTX | No transmission | |

| ACK/NACK feedback state of two subframes in PCell/SCell | Feedback state of PCell/SCell |
|---|---|
| {NACK, NACK/DTX} | State 1 |
| {ACK, NACK/DTX} | State 2 |
| {ACK/DTX, ACK} | State 3 |
| {ACK,ACK} | State 4 |

| ARI in SCell | PUCCH set 1, corresponding to $n^{(1)}_{PUCCH,2}$ | PUCCH set 1, corresponding to $n^{(1)}_{PUCCH,3}$ |
|---|---|---|
| ARI='00' | PUCCH 1 | PUCCH 1 |
| ARI='01' | PUCCH 2 | PUCCH 2 |
| ARI='10' | PUCCH 3 | PUCCH 3 |
| ARI='11' | PUCCH 4 | PUCCH 4 |

Fig. 8

| ARI in Scell | PUCCH set, corresponding to ($n^{(1)}_{PUCCH,2}$, $n^{(1)}_{PUCCH,3}$) |
|---|---|
| ARI='00' | PUCCHs (1,2) |
| ARI='01' | PUCCHs (2, 3) |
| ARI='10' | PUCCHs (3, 4) |
| ARI='11' | PUCCHs (4, 1) |

Fig. 9

| ARI on the first subframe after SCell is sorted according to DAI | PUCCH set 1, corresponding to $n^{(1)}_{PUCCH,2}$ | ARI on the first subframe after SCell is sorted according to DAI | PUCCHset 2, corresponding to $n^{(1)}_{PUCCH,3}$ |
|---|---|---|---|
| ARI='00' | PUCCH 1 | ARI='00' | PUCCH 1 |
| ARI='01' | PUCCH 2 | ARI='01' | PUCCH 2 |
| ARI='10' | PUCCH 3 | ARI='10' | PUCCH 3 |
| ARI='11' | PUCCH 4 | ARI='11' | PUCCH 4 |

| ARI on the first/second subframe after SCell is sorted according to DAI | PUCCH set, corresponding to $n^{(1)}_{PUCCH,2} / n^{(1)}_{PUCCH,3}$ |
|---|---|
| ARI='00' | PUCCH 1 |
| ARI='01' | PUCCH 2 |
| ARI='10' | PUCCH 3 |
| ARI='11' | PUCCH 4 |

| ACK/NACK feedback states of three subfrms in PCell/SCell | Feedback state of PCell/SCell |
|---|---|
| {NACK/DTX, arbitrary } | State 1 |
| {ACK, NACK/DTX, arbitrary} | State 2 |
| {ACK, ACK,NACK/DTX} | State 3 |
| {ACK,ACK,ACK} | State 4 |

Fig. 13

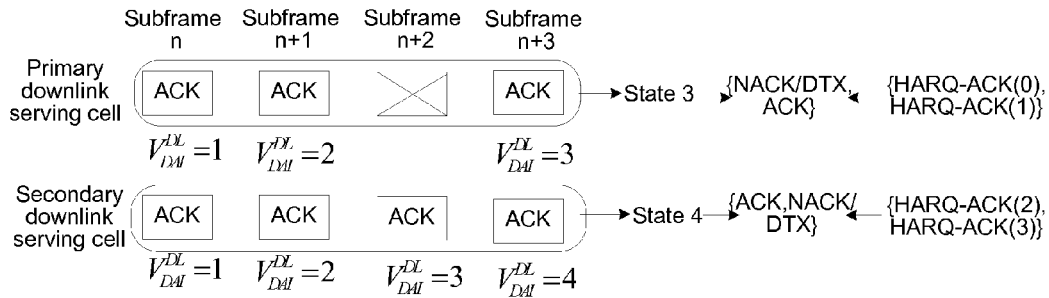

Fig. 14

| ACK/NACK feedback states of four subframes in PCell/SCell | Feedback state of PCell/SCell |
|---|---|
| {NACK/DTX, arbitrary, arbitrary, arbitrary }, or {ACK, NACK/DTX, arbitrary, arbitrary } | State 1 |
| {ACK, ACK, NACK/DTX, arbitrary } | State 2 |
| {ACK, ACK, ACK, NACK/DTX} | State 3 |
| {ACK, ACK, ACK, ACK} | State 4 |

Fig. 15

| ACK/NACK feedback states of four subframs in PCell/SCell | Feedback state of PCell/SCell |
|---|---|
| {NACK/DTX, arbitrary, arbitrary, arbitrary } | State 1 |
| {ACK, NACK/DTX, arbitrary, arbitrary } | State 2 |
| {ACK, ACK, NACK/DTX, arbitrary}, or {ACK, ACK, ACK, NACK/DTX} | State 3 |
| {ACK, ACK, ACK, ACK} | State 4 |

Fig. 16

| ARI on SCell | PUCCH set 1, corresponding to $n^{(1)}_{PUCCH,0}$ | PUCCH set 2, corresponding to $n^{(1)}_{PUCCH,1}$ | PUCCH set 3, corresponding to $n^{(1)}_{PUCCH,2}$ | PUCCH set 4, corresponding to $n^{(1)}_{PUCCH,3}$ |
|---|---|---|---|---|
| ARI='00' | PUCCH 1 | PUCCH 1 | PUCCH 1 | PUCCH 1 |
| ARI='01' | PUCCH 2 | PUCCH 2 | PUCCH 2 | PUCCH 2 |
| ARI='10' | PUCCH 3 | PUCCH 3 | PUCCH 3 | PUCCH 3 |
| ARI='11' | PUCCH 4 | PUCCH 4 | PUCCH 4 | PUCCH 4 |

Fig. 17

| ARI on the first/second subframe after the SCell is sorted according to DAI | PUCCH set 1, corresponding to ($n^{(1)}_{PUCCH,0}$, $n^{(1)}_{PUCCH,2}$) | PUCCH set 2, corresponding to ($n^{(1)}_{PUCCH,1}$, $n^{(1)}_{PUCCH,3}$) |
|---|---|---|
| ARI='00' | PUCCHs (1, 2) | PUCCHs (1, 2) |
| ARI='01' | PUCCHs (2, 3) | PUCCHs (2, 3) |
| ARI='10' | PUCCHs (3, 4) | PUCCHs (3, 4) |
| ARI='11' | PUCCHs (4, 1) | PUCCHs (4, 1) |

METHOD FOR SENDING HYBRID AUTOMATIC REPEAT REQUEST ACKNOWLEDGEMENT MESSAGE AND USER EQUIPMENT

TECHNICAL FIELD

The disclosure relates to the field of communications, and in particular to a method for sending a Hybrid Automatic Repeat Request Acknowledgement (HARQ-ACK) message in a Time Division Duplex (TDD) system in which Carrier Aggregation (CA) is adopted and a User Equipment (UE).

BACKGROUND

In the HARQ way, the codeword sent by a sending end not only can detect an error but also can correct the error sometimes. After receiving the codeword, a receiving end detects the error at first, and then corrects the error automatically if the error is within the error correction capability of the codeword; if there are many errors and the errors are beyond the error correction capability but can be detected, the receiving end sends a decision signal to the sending end through a feedback channel to demand the sending end to resend the message. In an Orthogonal Frequency Division Multiplex (OFDM) system, the transmission correctness/wrongness is represented by an Acknowledgement/Negative-Acknowledgement (ACK/NACK) message, so as to judge whether retransmission is required. The transmitted ACK message or NACK message is collectively referred to as HARQ-ACK message.

In a Long Term Evolution (LTE) system (its corresponding standard protocol is Rel-8/9), an HARQ-ACK message can be sent separately in a Physical Uplink Control Channel (PUCCH) or sent with data in a Physical Uplink Shared Channel (PUSCH).

In a Frequency Division Duplex (FDD) system, since uplink and downlink subframes are in a one-to-one correspondence relationship, if only one codeword stream is included in a Physical Downlink Shared Channel (PDSCH), the UE will feed back an HARQ-ACK message of one bit; if two codeword streams are included in the PDSCH, the UE will feed back an HARQ-ACK message of two bits; and if there is no PUSCH for the UE to send in the current subframe, the UE will send the HARQ-ACK message of one bit or two bits in PUCCH in format 1a/1b; while if there is PUSCH for the UE to send in the current subframe, the UE will perform ACK/NACK-state-to-bit mapping, channel coding, scrambling and modulation on the one bit or two bits and then multiplex it with data, so as for transmission in PUSCH.

In a TDD system, since the uplink and downlink subframes are not in a one-to-one correspondence relationship, that is to say, the HARQ-ACK messages corresponding to a plurality of downlink subframes have to be sent in the PUCCH/PUSCH of a single uplink frame, where a set of downlink subframes corresponding to a single uplink frame form a bundling window. In the LTE TDD, two methods for sending the HARQ-ACK message are defined. One is an HARQ-ACK bundling method. The basic idea of this method is to perform logic AND operation on the HARQ-ACK messages fed back in the uplink subframe corresponding to the respective codeword streams corresponding to the downlink subframes. If the PDSCH transmission of one downlink subframe includes two codeword streams, the UE has to feed back a two-bit (each bit corresponding to a respective codestream) HARQ-ACK message subjected to the subframe logic AND operation; if the PDSCH transmission of each subframe only includes one codeword stream, the UE has to feed back an one-bit (which corresponds to the codeword stream) HARQ-ACK message subjected to the subframe logic AND operation; if there is no PUSCH for the UE to send in the current subframe, the UE will send an one or two-bit HARQ-ACK message in PUCCH format 1a/1 b; while if there is a PUSCH for the UE to send in the current subframe, the UE will perform ACK/NACK-state-to-bit mapping, channel coding, scrambling and modulation on the one bit or two bits and then multiplex it with data, so as for transmission in PUSCH. The other one is an ACK/NACK multiplexing method. By this method, it is necessary to feed back one HARQ-ACK message for each downlink subframe, and it is necessary to feed back a plurality of HARQ-ACK messages for a plurality of subframes. When the PDSCH transmission of a downlink subframe includes two codeword streams, the HARQ-ACK message of each codeword is subjected to logic AND operation at first, such that finally each downlink subframe corresponds to one HARQ-ACK message. If there is a downlink subframe which is not scheduled, its HARQ-ACK message is set to a Discontinuous Transmission (DTX) state. That is to say, in an HARQ-ACK multiplexing mode, the HARQ-ACK message can indicate three feedback states: ACK, NACK and DTX. When there is no PUSCH for the UE to send in the current subframe, the UE will send the plurality of HARQ-ACK messages in PUCCH in format 1 b with channel selection. The core idea of this method is to represent the HARQ-ACK messages on different subframes by using different PUCCHs and different modulation symbols on a channel. By this method, an HARQ-ACK message of up to four bits can be carried in PUCCH format 1b with channel selection. LTE defines the mapping table (mapping table for short) between the state combination of the HARQ-ACK messages and the selected PUCCH as well as the two bits b(0)b(1) carried in the channel when different subframes are assigned, namely, when the uplink and the downlink subframes are assigned to be 1:2/3/4 respectively. Here, the three mapping tables are called mapping tables of the LTE.

Whether the UE uses the HARQ-ACK bundling or the HARQ-ACK multiplexing to feed back the HARQ-ACK message is configured by a high layer signaling.

To meet the requirements of the International Telecommunication Union-Advanced (ITU-Advanced), as the evolution standard of the LTE (its corresponding standard protocol is Rel-10), a Long Term Evolution Advanced (LTE-A) system must support an increased system bandwidth (up to 100 MHz), and must be backward compatible with the current LTE standard. Based on the current LTE system, the bandwidth of the LTE system can be combined to obtain an increased bandwidth, which is called Carrier Aggregation (CA) technology. And this technology can improve the spectrum efficiency and alleviate the shortage of spectrum resources of the IMT-Advance system, so as to optimize the utilization of spectrum resources.

In a system in which the CA is introduced, the carrier to be aggregated is called a Component Carrier (CC) or a Serving Cell (SC). Meanwhile, the concepts of Primary Component Carrier/Cell (PCC/PCell) and Secondary Component Carrier/Cell (SCC/SCell) are also put forward. The system in which the CA is performed includes at least one PCell and one SCell, where the PCell is active all the time. In the following description, the component carrier and the Serving cell are equivalent.

When the LTE-A uses the CA technology and a base station configured a plurality of downlink Serving cells for the UE, the UE has to feed back HARQ-ACK messages of corresponding codeword streams of the downlink Serving cells. In the LTE-A, two feedback modes are defined for the transmission of the HARQ-ACK message in PUCCH: a feedback mode of PUCCH format 1b with channel selection and a DFT-s-OFDM based feedback mode.

For an FDD system, format 1 b with channel selection is only applicable to the scenario in which two Serving cells are aggregated, and thus, in this scenario, the codeword stream in each SC corresponds to a respective HARQ-ACK message. The number of bits of the HARQ-ACK message fed back in the FDD system is determined according to the number of assigned Serving cells and the transmission mode, that is to say, when two Serving cells are assigned for the UE, if both the Serving cells are configured in a transmission mode of single codeword stream and the UE uses PUCCH format 1b with channel selection as the HARQ-ACK feedback mode, the UE will use the mapping table A=2 (as shown in FIG. 1), where A represents the number of HARQ-ACK messages corresponding to the codeword streams; if one of the Serving cells is assigned in a transmission mode of single codeword stream and the other is assigned in a transmission mode of dual codeword streams, the UE will use the mapping table A=3 (as shown in FIG. 2), and if both the Serving cells are assigned in the transmission mode of dual codeword streams, the UE will use the mapping table A=4 (as shown in FIG. 3). Here, the mapping tables are called LTE-A mapping table.

For a TDD system, because uplink and downlink subframes are not symmetric, for some uplink subframes, the HARQ-ACK messages of a plurality of downlink subframes have to be feed back in each of them according to different uplink and downlink configurations. In a TDD system in which the CA technology is introduced, a single uplink subframe may be used to feed back the HARQ-ACK messages of a plurality of downlink subframes and downlink Serving cells. In an LTE-A TDD system, PUCCH format 1 b with channel selection can also be used to feed back the HARQ-ACK message. Since PUCCH format 1b with channel selection can support four bits at most, the HARQ-ACK messages fed back have to be bundled in the LTE-A TDD system in a certain form in order that the number of the feedback bits is limited to four and the number of supportable downlink Serving cells is limited to two. It is assumed that time domain bundling is performed but inter-cell bundling is not supported now, but there is still no specific scheme about how to feed back the HARQ-ACK messages of each downlink serving cell and downlink subframe in PUCCH format 1 b with channel selection. Moreover, regarding how to obtain the corresponding PUCCH resources for PUCCH format 1 b with channel selection, there is still no conclusion in the TDD system. Another problem is that there is still no conclusion about whether the LTE-A mapping table used by the FDD is applicable to the TDD system now.

SUMMARY

In view of this, the disclosure provides a method for sending an HARQ-ACK message in a TDD system and a UE in order that the UE feeds back the HARQ-ACK message of each downlink serving cell and downlink subframe in PUCCH format 1b with channel selection in the TDD system.

The method for sending the HARQ-ACK message when the UE feeds back the HARQ-ACK message in PUCCH format 1 b with channel selection in the TDD system specifically includes:

when the number M of downlink subframe included in the downlink subframe window (bundling window) corresponding to an uplink subframe is equal to 1, the HARQ-ACK message is fed back in the same feedback mode as that of the LTE-A FDD system; and when the number M of downlink subframe included in the downlink subframe window (bundling window) corresponding to an uplink subframe is more than 1, the feedback mode of the HARQ-ACK message is determined by feedback mode determining approach 1 or feedback mode determining approach 2.

The contents of the feedback mode include: which mapping table, method for generating the HARQ-ACK message in the mapping table and method for determining the corresponding PUCCH resources the UE will select.

Feedback mode determining approach 1:
the feedback mode when the UE feeds back the HARQ-ACK message in PUCCH format 1b with channel selection is determined through a high-layer signaling.

Feedback mode determining approach 2:
the feedback mode when the UE feeds back the HARQ-ACK message in PUCCH format 1b with channel selection is determined according to whether the UE receives a PDSCH from the secondary downlink serving cell.

The feedback modes in the disclosure include feedback mode 1 and feedback mode 2.

In feedback mode 1, the UE adopts the mapping table defined by the LTE-A (Rel-10), generates the HARQ-ACK in the mapping table by a time domain bundling method and determines the corresponding PUCCH resources in the mapping table by a preset new PUCCH resource determining method.

In Feedback mode 2, the UE generates the HARQ-ACK message in the mapping table by the HARQ-ACK generating method in the HARQ-ACK multiplexing mode of the LTE (Rel-8/9) TDD system, and determines the corresponding PUCCH resources in the mapping table by the PUCCH resource determining method in the HARQ-ACK multiplexing mode of the LTE system, namely, the HARQ-ACK message is fed back in an Rel-8 HARQ-ACK multiplexing mode.

When the feedback mode of the HARQ-ACK message is determined by method 1 for determining the feedback mode, the high-layer signaling can be a feedback mode selection signaling, namely, after receiving the high-layer signaling, the UE determines the feedback mode according to the received high-layer signaling, wherein feedback mode 2 is the default feedback mode. Or, the high-layer signaling is a CA (configuration) signaling, namely, when a plurality of serving cells are configured for the UE (namely, the UE is configured to perform CA), the UE adopts feedback mode 1 for feedback; and when only one SC is configured for the UE (namely, the UE is configured not to perform CA), the UE adopts feedback mode 2 for feedback.

When the feedback mode of the HARQ-ACK message is determined by method 2 for determining the feedback mode, the UE adopts feedback mode 1 for feedback when receiving the PDSCH from the secondary downlink serving cell; otherwise, the UE adopts feedback mode 2 for feedback, namely, the UE adopts feedback mode 2 for feedback when receiving the PDSCH from the primary downlink serving cell and/or the downlink control information indicating the semi-static persistent scheduling release; otherwise, the UE adopts feedback mode 1 for feedback.

The mapping table adopted by the UE in feedback mode 2 is that defined by LTE or LTE-A or is that assigned to be defined by LTE or LTE-A by a high-layer signaling.

In feedback modes 1 and 2, the mapping table defined by LTE-A can be one adopted by an LTE-A FDD system when A=4 (as shown in FIG. 3) or one newly defined for the TDD by the LTE-A (as shown in FIG. 4).

In feedback mode 1, the step that the UE generates the HARQ-ACK message in the mapping table by the time domain bundling method specifically includes:

Step 01: For each downlink serving cell, the UE obtains the feedback state of each downlink SC according to the HARQ-ACK messages of M downlink subframes, where M is the number of the downlink subframe included in a downlink subframe window corresponding to one uplink subframe, which is determined according to the configuration of the uplink and downlink subframes, here, only the configuration of uplink and downlink subframes when M=2, 3, 4 and two downlink serving cells are considered.

Step 02: The obtained feedback state of each downlink serving cell is mapped to {HARQ-ACK(i), HARQ-ACK(i−1)} in the mapping table in a preset mode, so as to obtain the HARQ-ACK in the mapping table, where i=0, 2.

In Step 01, the feedback state of each downlink serving cell obtained by the UE according to the ACK/NACK messages of M downlink subframes is one of the following four states:

When M=2, feedback state 1 indicates that the HARQ-ACK messages of both the first and the second downlink subframes are NACK or DTX;

feedback state 2 indicates that the HARQ-ACK message of the first downlink subframe is ACK and that of the second downlink subframe is NACK or DTX;

feedback state 3 indicates that the HARQ-ACK message of the first downlink subframe is NACK or DTX and that of the second downlink subframe is ACK; and feedback state 4 indicates that the HARQ-ACK messages of both the first and the second downlink subframes are ACK.

Furthermore, when M=3 or 4, the UE sorts the corresponding HARQ-ACK messages in an ascending sequence of the Downlink Assignment Index (DAI) values in the PDCCH corresponding to the PDSCH of each downlink subframe, and the HARQ-ACK message without DAI is sorted first relative to that with DAI. The UE maps the number of the messages which are continuously fed back as ACK from the first ACK message in the sorted ACK messages to the feedback state of a corresponding downlink SC, wherein when the PDSCH of the downlink subframe corresponds to two ACK messages, the two ACK messages are subjected to logic AND operation and then sorted.

Furthermore, the feedback state of each downlink SC obtained by the UE according to the ACK/NACK messages of M downlink subframes is one of the following four states:

When M=3, feedback state 1 indicates that the first sorted HARQ-ACK message is NACK or DTX, and other HARQ-ACK messages are arbitrary;

feedback state 2 indicates that the first sorted HARQ-ACK message is ACK, the second sorted HARQ-ACK message is NACK or DTX, and other HARQ-ACK messages are arbitrary;

feedback state 3 indicates that the first two sorted HARQ-ACK messages are ACK, and the third HARQ-ACK message is NACK or DTX; and feedback state 4 indicates that the first three sorted HARQ-ACK messages are ACK.

When M=4, feedback state 1 indicates that the first sorted HARQ-ACK message is NACK or DTX, and other HARQ-ACK messages are arbitrary;

feedback state 2 indicates that the first sorted HARQ-ACK message is ACK, the second sorted HARQ-ACK message is NACK or DTX, and other ACK/NACK messages are arbitrary;

feedback state 3 indicates that the first two sorted HARQ-ACK messages are both ACK and the third HARQ-ACK message is NACK or DTX, or, the first three sorted HARQ-ACK messages are ACK and the fourth HARQ-ACK message is NACK or DTX, and other HARQ-ACK messages are arbitrary; and feedback state 4 indicates that all the four sorted HARQ-ACK messages are ACK.

Or, when M=4, feedback state 1 indicates that the first sorted HARQ-ACK message is NACK or DTX, or, the first sorted HARQ-ACK message is ACK and the second HARQ-ACK message is NACK or DTX, and other HARQ-ACK messages are arbitrary;

feedback state 2 indicates that the first two sorted HARQ-ACK messages are ACK, the third sorted HARQ-ACK message is NACK or DTX, and other HARQ-ACK messages are arbitrary;

feedback state 3 indicates that the first three sorted HARQ-ACK messages are all ACK and the fourth sorted HARQ-ACK message is NACK or DTX; and feedback state 4 indicates that the four sorted HARQ-ACK messages are all ACK.

In Step 02, the step that the obtained feedback state of each downlink SC is mapped to {HARQ-ACK(i), HARQ-ACK(i−1)} in the mapping table in a preset mode to obtain the HARQ-ACK in the mapping table specifically includes:

feedback state 1 is mapped to {NACK/DTX, NACK/DTX};

feedback state 2 is mapped to {ACK, NACK/DTX};

feedback state 3 is mapped to {NACK/DTX, ACK}; and feedback state 4 is mapped to {ACK, ACK}.

Preferably, the feedback state of the primary downlink serving cell is mapped to HARQ-ACK(0), HARQ-ACK(1) of the mapping table, and the feedback state of the secondary downlink serving cell is mapped to HARQ-ACK(2), HARQ-ACK(3) of the mapping table.

In feedback mode 1, determining the corresponding PUCCH resources in the mapping table by a new preset PUCCH resource determining method is one of the following methods:

Method 1 for determining PUCCH resources: [which is adapted to feedback mode determining approach 1]

$n_{PUCCH,0}^{(1)}$, $n_{PUCCH,1}^{(1)}$, $n_{PUCCH,2}^{(1)}$ and $n_{PUCCH,3}^{(1)}$ are four PUCCHs assigned by a high layer;

or, $n_{PUCCH,0}^{(1)}$ and $n_{PUCCH,1}^{(1)}$ are determined according to the HARQ-ACK messages corresponding to the first and the second downlink subframes of the primary downlink serving cell or the PUCCH resources corresponding to the first and the second sorted HARQ-ACK messages;

$n_{PUCCH,2}^{(1)}$ and $n_{PUCCH,3}^{(1)}$ are two PUCCHs assigned by a high layer (mode 1), or, are determined by a PUCCH assigned by the high layer in combination with an Allocated Resource Indicator (ARI) in the PDCCH of the downlink subframe corresponding to the secondary downlink serving cell (mode 2), or, are implicitly determined according to the HARQ-ACK messages corresponding to the first and the second downlink subframes of the secondary downlink cell or the PDCCH corresponding to the first and the second sorted HARQ-ACK messages (the PDCCH is sent in the primary downlink serving cell) when the PDSCH of the secondary downlink serving cell adopts cross-carrier scheduling (namely, the downlink configuration information PDCCH of PDSCH of the secondary downlink serving cell is sent in the primary downlink serving cell) (mode 3).

Note: the PDSCH without PDCCH may exist in the PCell, while the PDSCH without PDCCH may not exist in the SCell if cross-carrier scheduling is adopted, thus, the description may be different.

Furthermore, the step that $n_{PUCCH,0}^{(1)}$ and $n_{PUCCH,1}^{(1)}$ are determined according to the HARQ-ACK messages corresponding to the first and the second downlink subframes of the primary downlink serving cell or the PUCCH resources corresponding to the first and the second sorted HARQ-ACK messages specifically includes:

when there is PDCCH corresponding to the corresponding PDSCH of the ACK message, $n_{PUCCH,0}^{(1)}$ and $n_{PUCCH,1}^{(1)}$ are implicitly determined according to the PDCCH; and when there is no PDCCH corresponding to the corresponding PDSCH of the ACK message (namely, the PDSCH is a Semi Persistent Scheduling (SPS) PDSCH), $n_{PUCCH,0}^{(1)}$ and $n_{PUCCH,1}^{(1)}$ are determined according to the PUCCH resources assigned by the high layer and a Transmission Power Control (TPC) command in the Downlink Control Information (DCI) when the SPS PDSCH is active.

Furthermore, the step that $n_{PUCCH,0}^{(1)}$ and $n_{PUCCH,1}^{(1)}$ are implicitly determined according to the PDCCH specifically includes: they are determined according to one function of the least (lowest) index $n_{CCE}$ of the Control Channel Element (CCE) where the PDCCH is located.

Furthermore, the step that $n_{PUCCH,2}^{(1)}$ and $n_{PUCCH,3}^{(1)}$ are determined by the PUCCH assigned by the high layer in combination with an ARI in the PDCCH of the downlink subframe corresponding to the secondary downlink serving cell specifically includes:

the high layer assigns two PUCCH sets each including four PUCCHs, wherein one of the PUCCH sets corresponds to $n_{PUCCH,2}^{(1)}$ resources and the other PUCCH set corresponds to $n_{PUCCH,3}^{(1)}$ resources, and the corresponding PUCCH resources of $n_{PUCCH,2}^{(1)}$ and $n_{PUCCH,3}^{(1)}$ in their corresponding sets are determined according to the ARI, wherein the ARI of each subframe corresponding to the secondary downlink serving cell has the same value;

or, the high layer assigns one PUCCH set which includes four PUCCHs, and which two PUCCH resources $n_{PUCCH,2}^{(1)}$ and $n_{PUCCH,3}^{(1)}$ correspond to in the set are determined according to the ARI, wherein the ARI of each subframe corresponding to the secondary downlink serving cell has the same value;

or, the high layer assigns two PUCCH sets each including four PUCCHs, the ARI in the PDCCH corresponding to the HARQ-ACK message corresponding to the first downlink subframe or the first sorted HARQ-ACK message in the secondary downlink serving cell indicates which PUCCH in PUCCH set 1 $n_{PUCCH,2}^{(1)}$ corresponds to, and the ARI in the PDCCH corresponding to the HARQ-ACK message corresponding to the second downlink subframe or the second sorted HARQ-ACK message in the secondary downlink serving cell indicates which PUCCH in PUCCH set 2 $n_{PUCCH,3}^{(1)}$ corresponds to;

or, the high layer assigns one PUCCH set which includes four PUCCHs, the ARI in the PDCCH corresponding to the HARQ-ACK message corresponding to the first downlink subframe or the first sorted HARQ-ACK message in the secondary downlink serving cell indicates that $n_{PUCCH,2}^{(1)}$ corresponds to one PUCCH in the PUCCH set, and the HARQ-ACK message corresponding to the second downlink subframe of the secondary downlink serving cell or the ARI in the PDCCH corresponding to the second sorted HARQ-ACK message indicates that $n_{PUCCH,3}^{(1)}$ corresponds to another PUCCH in the PUCCH set, wherein the HARQ-ACK messages of the first and the second downlink subframes of the secondary downlink serving cell or the ARIs corresponding to the first and the second sorted HARQ-ACK messages have different values.

Method 2 for determining PUCCH resources: [which is adapted to feedback mode determining approach 2]

$n_{PUCCH,0}^{(1)}$, $n_{PUCCH,1}^{(1)}$, $n_{PUCCH,2}^{(1)}$ and $n_{PUCCH,3}^{(1)}$ are four PUCCHs assigned by the high layer;

or $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with an ARI in the PDCCH corresponding to the secondary downlink serving cell;

or, when the downlink configuration information PDCCH of PDSCH of the secondary downlink serving cell is not sent in the primary downlink serving cell, $n_{PUCCH,0}^{(1)}$, $n_{PUCCH,1}^{(1)}$, $n_{PUCCH,2}^{(1)}$ and $n_{PUCCH,3}^{(1)}$ are four PUCCHs assigned by the high layer; when the PDSCH of the secondary downlink serving cell adopts cross-carrier scheduling (namely, the downlink configuration information PDCCH of PDSCH of the secondary downlink serving)) cell is sent in the primary downlink serving cell), $n_{PUCCH,0}^{(1)}$ and $n_{PUCCH,1}^{(1)}$ are two PUCCHs assigned by the high layer, and $n_{PUCCH,2}^{(1)}$ and $n_{PUCCH,3}^{(1)}$ are determined according to the HARQ-ACK messages corresponding to the first and the second downlink subframes of the secondary downlink serving cell or one function of the least (lowest) index $n_{CCE}$ of the CCE where the PDCCH is located (the PDCCH is sent in the primary downlink serving cell);

or, when the downlink configuration information PDCCH of PDSCH of the secondary downlink serving cell is not sent in the primary downlink serving cell, $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with an ARI in the PDCCH corresponding to the secondary downlink serving cell; when the PDSCH of the secondary downlink serving cell adopts cross-carrier scheduling (namely, the downlink configuration information PDCCH of PDSCH of the secondary downlink serving cell is sent in the primary downlink serving cell), $n_{PUCCH,0}^{(1)}$ and $n_{PUCCH,1}^{(1)}$ are determined by the PUCCH assigned by the high layer in combination with an ARI in the PDCCH corresponding to the secondary downlink serving cell, and $n_{PUCCH,2}^{(1)}$ and $n_{PUCCH,3}^{(1)}$ are determined according to the HARQ-ACK messages corresponding to the first and the second downlink subframes of the secondary downlink serving cell or one function of the least (lowest) index $n_{CCE}$ of the CCE where the PDCCH is located (the PDCCH is sent in the primary downlink serving cell).

Furthermore, the step that $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with an ARI in the PDCCH corresponding to the secondary downlink serving cell specifically includes:

the high layer assigns four PUCCH sets each including four PUCCHs, and the ARI in PDCCH of the secondary downlink serving cell indicates the PUCCH set index and that $n_{PUCCH,0}^{(1)}$, $n_{PUCCH,1}^{(1)}$, $n_{PUCCH,2}^{(1)}$ and $n_{PUCCH,3}^{(1)}$ correspond to one PUCCH in the four PUCCH sets respectively, wherein the ARI of each subframe corresponding to the secondary downlink serving cell has the same value;

or, the high layer assigns two PUCCH sets each including four PUCCHs, the ARI in the PDCCH corresponding to the HARQ-ACK message corresponding to the first downlink subframe or the first sorted HARQ-ACK message in the secondary downlink serving cell indicates which two PUCCHs $n_{PUCCH,0}^{(1)}$ and $n_{PUCCH,2}^{(1)}$ correspond to in PUCCH set 1, and the ARI in the PDCCH corresponding to the HARQ-ACK message corresponding to the second downlink subframe or the second sorted HARQ-ACK message in the secondary downlink serving cell indicates which two PUCCHs $n_{PUCCH,1}^{(1)}$ and $n_{PUCCH,3}^{(1)}$ correspond to in PUCCH set 2.

Furthermore, the step that $n_{PUCCH,0}^{(1)}$ and $n_{PUCCH,1}^{(1)}$ are determined by the PUCCH assigned by the high layer in combination with an ARI in the PDCCH corresponding to the secondary downlink serving cell specifically includes:

the high layer assigns one PUCCH set which includes four PUCCHs, and which two PUCCH resources $n_{PUCCH,0}^{(1)}$ and $n_{PUCCH,1}^{(1)}$ correspond to in the set are determined according to the ARI, wherein the ARI of each subframe corresponding to the secondary downlink serving cell has the same value;

or, the high layer assigns two PUCCH sets each including four PUCCHs, the ARI in the PDCCH corresponding to the HARQ-ACK message corresponding to the first subframe or the first sorted HARQ-ACK message in the secondary downlink serving cell indicates which PUCCH $n_{PUCCH,0}^{(1)}$ corresponds to in PUCCH set 1, and the ARI in the PDCCH corresponding to the HARQ-ACK message corresponding to the second subframe or the second sorted HARQ-ACK message in the secondary downlink serving cell indicates which PUCCH $n_{PUCCH,1}^{(1)}$ corresponds to in PUCCH set 2;

or, the high layer assigns one PUCCH set which includes four PUCCHs, the ARI in the PDCCH corresponding to the HARQ-ACK message corresponding to the first downlink subframe or the first sorted HARQ-ACK message in the secondary downlink serving cell indicates that $n_{PUCCH,0}^{(1)}$ corresponds to one PUCCH in the PUCCH set, and the ARI in the PDCCH corresponding to the HARQ-ACK message corresponding to the second downlink subframe or the second sorted HARQ-ACK message in the secondary downlink serving cell indicates that $n_{PUCCH,1}^{(1)}$ corresponds to another PUCCH in the PUCCH set, wherein the ARIs corresponding to the HARQ-ACK messages corresponding to the first and the second downlink subframes or the first and the second sorted HARQ-ACK messages in the secondary downlink serving cell have different values.

Through the disclosure, the UE can feed back the ACK/NACK message of each downlink serving cell and downlink subframe in PUCCH format 1b with channel selection in the TDD system.

BRIEF DESCRIPTION OF THE DRAWINGS

FIG. 1 is a mapping table between an HARQ-ACK message and a selected PUCCH as well as b(0) b(1) when A=2;

FIG. 2 is a mapping table between an HARQ-ACK message and a selected PUCCH as well as b(0) b(1) when A=3;

FIG. 3 is a mapping table between an HARQ-ACK message and a selected PUCCH as well as b(0) b(1) when A=4;

FIG. 4 is another mapping table between an HARQ-ACK message and a selected PUCCH as well as b(0) b(1) when A=4;

FIG. 8 is another diagram showing the determination of $n_{PUCCH,2}^{(1)}$ and $n_{PUCCH,3}^{(1)}$ by the PUCCH assigned by a high layer in combination with the ARI in the PDCCH of a downlink frame corresponding to the downlink serving cell in method 1 for determining PUCCH resources;

FIG. 9 is another diagram showing the determination of $n_{PUCCH,2}^{(1)}$ and $n_{PUCCH,3}^{(1)}$ by the PUCCH assigned by a high layer in combination with the ARI in the PDCCH of a downlink frame corresponding to the downlink serving cell in method 1 for determining PUCCH resources;

FIG. 13 is a diagram showing the ACK/NACK message of each downlink subframe in a TDD system when two downlink serving cells are assigned for the UE and M=4;

FIG. 14 is a diagram showing the generation of feedback state of a downlink serving cell when M=4;

FIG. 15 is another diagram showing the generation of feedback state of a downlink serving cell when M=4;

FIG. 16 is a diagram showing the determination of $n_{PUCCH,0}^{(1)}$, $n_{PUCCH,1}^{(1)}$, $n_{PUCCH,2}^{(1)}$ and $n_{PUCCH,3}^{(1)}$ by the PUCCH assigned by a high layer in combination with the ARI in the PDCCH of a downlink frame corresponding to the downlink serving cell in method 1 for determining PUCCH resources; and FIG. 17 is another diagram showing the determination of $n_{PUCCH,0}^{(1)}$, $n_{PUCCH,1}^{(1)}$, $n_{PUCCH,2}^{(1)}$ and $n_{PUCCH,3}^{(1)}$ by the PUCCH assigned by a high layer in combination with the ARI in the PDCCH of a downlink frame corresponding to the downlink serving cell in method 2 for determining PUCCH resources.

DETAILED DESCRIPTION

In order to describe the subject matter and advantages of the disclosure more clearly, the disclosure is further described below in conjunction with the drawings in detail.

Embodiment 1: [determining feedback mode determining approach 1, feedback mode 1, subframe window M=2]

Figures 5, 6, 7:
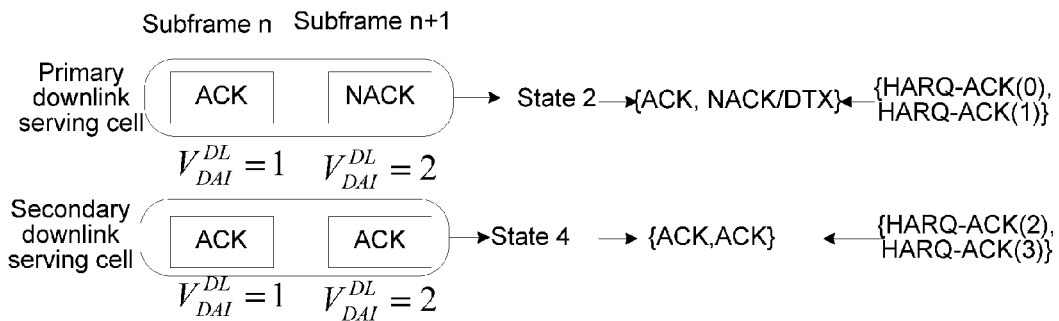
FIG. 5 is a diagram showing the ACK/NACK message of each downlink subframe in a TDD system when two downlink serving cells are assigned for the UE and M=2.
FIG. 6 is a diagram showing the generation of feedback state of a downlink serving cell when M=2.
FIG. 7 is a diagram showing the determination of $n_{PUCCH,2}^{(1)}$ and $n_{PUCCH,3}^{(1)}$ by the PUCCH assigned by a high layer in combination with the ARI in the PDCCH of a downlink frame corresponding to the downlink serving cell in method 1 for determining PUCCH resources.

As shown in FIG. 5, provided that the current base station assigns two downlink serving cells for a UE: a PCell and a SCell, and the current uplink subframe has to feed back HARQ-ACK messages of M downlink subframes (M=2), the two HARQ-ACK messages are subjected to logic AND operation when the PDSCHs of the downlink subframes correspond to two HARQ-ACK messages. It is assumed that the PDSCH of the SCell does not adopt cross-carrier scheduling and the scheduling of PDSCH of each downlink subframe includes corresponding PDCCH. It is assumed that the HARQ-ACK messages of two subframes in the PCell and SCell are {ACK, NACK} and {ACK, ACK} respectively.

It is assumed that the UE feeds back the HARQ-ACK message in format 1 b with channel selection and the base station assigns through high-layer signaling that the UE feeds back the HARQ-ACK in feedback mode 1 (i.e., feedback mode determining approach 1 in the disclosure).

For feedback mode 1, the UE determines the feedback state of each downlink serving cell according to the HARQ-ACK messages of M downlink subframes, specifically as shown in FIG. 6.

The HARQ-ACK messages of two subframes corresponding to the PCell are {ACK, NACK} respectively, so the corresponding feedback state is state 2.

The HARQ-ACK messages of two subframes corresponding to the SCell are {ACK, ACK} respectively, so the corresponding feedback state is state 4.

The obtained feedback state of the PCell/SCell is mapped to {HARQ-ACK(i), HARQ-ACK(i−1)} in the mapping table in a pre-defined way, namely, state 2->{ACK, NACK/DTX}->{HARQ-ACK(0), HARQ-ACK(1)}, and state 4->{ACK, ACK}->{HARQ-ACK(2), HARQ-ACK(3)}.

For the determination of corresponding PUCCH resources in the mapping table, since the UE is configured to feed back an ACK/NACK message in feedback mode 1 by high-layer signaling in the embodiment, resource determining approach 1 will be adopted to determine the PUCCH resources, specifically as follows:

$n_{PUCCH,0}^{(1)}$ is implicitly determined according to the PDCCH of the first subframe in the primary downlink serving cell, namely, it is determined according to a function of a minimum (lowest) index $n_{CCE}$ of a CCE where the PDCCH is located;

$n_{PUCCH,1}^{(1)}$ is implicitly determined according to the PDCCH of the second subframe in the primary downlink serving cell, namely, it is determined according to the function of the minimum (lowest) index $n_{CCE}$ of the CCE where the PDCCH is located; and $n_{PUCCH,2}^{(1)}$ and $n_{PUCCH,3}^{(1)}$ are two PUCCHs assigned by a high layer since the SCell does not perform cross-carrier scheduling, or are determined by the PUCCH assigned by the high layer in combination with the ARI in the PDCCH corresponding to the secondary downlink serving cell.

Figures 10, 11, 12:
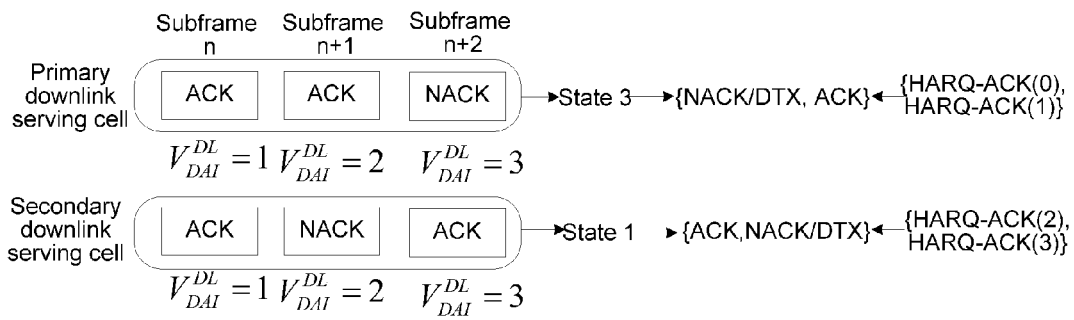
FIG. 10 is another diagram showing the determination of $n_{PUCCH,2}^{(1)}$ and $n_{PUCCH,3}^{(1)}$ by the PUCCH assigned by a high layer in combination with the ARI in the PDCCH of a downlink frame corresponding to the downlink serving cell in method 1 for determining PUCCH resources.
FIG. 11 is a diagram showing the ACK/NACK message of each downlink subframe in a TDD system when two downlink serving cells are assigned for the UE and M=3.
FIG. 12 is a diagram showing the generation of feedback state of a downlink serving cell when M=3.

When n $n_{PUCCH,2}^{(1)}$ and $n_{PUCCH,3}^{(1)}$ are determined by the PUCCH assigned by the high layer in combination with the ARI in the PDCCH corresponding to the secondary downlink serving cell, the following way is adopted:

as shown in FIG. 7, the high layer assigns two PUCCH sets each including four PUCCHs, wherein one of the PUCCH sets corresponds to $n_{PUCCH,2}^{(1)}$ resources and the other PUCCH set corresponds to $n_{PUCCH,3}^{(1)}$ resources, and the corresponding PUCCH resources of $n_{PUCCH,2}^{(1)}$ and $n_{PUCCH,3}^{(1)}$ in their corresponding sets are determined according to the ARI, wherein the ARI of each subframe corresponding to the secondary downlink serving cell has the same value;

or, as shown in FIG. 8, the high layer assigns one PUCCH set, and which two PUCCH resources in the set correspond to $n_{PUCCH,2}^{(1)}$ and $n_{PUCCH,3}^{(1)}$ are determined according to the ARI, wherein the ARI of each subframe corresponding to the secondary downlink serving cell has the same value;

or, as shown in FIG. 9, the high layer assigns two PUCCH sets each including four PUCCHs, the ARI in the PDCCH corresponding to the first sorted ACK message in the secondary downlink serving cell indicates which PUCCH in PUCCH set 1 corresponds to $n_{PUCCH,2}^{(1)}$, and the ARI in the PDCCH corresponding to the second sorted ACK message in the secondary downlink serving cell indicates which PUCCH in PUCCH set 2 corresponds to $n_{PUCCH,3}^{(1)}$;

or, as shown in FIG. 10, the high layer assigns one PUCCH set which includes four PUCCHs, the ARI in the PDCCH corresponding to the first sorted ACK message in the secondary downlink serving cell indicates which PUCCH in the PUCCH set corresponds to $n_{PUCCH,2}^{(1)}$, and the ARI in the PDCCH corresponding to the second sorted ACK message in the secondary downlink serving cell indicates which of other PUCCHs in the PUCCH set corresponds to, wherein the ARIs corresponding to the first and second sorted ACK messages in the secondary downlink serving cell have different values.

Provided that the mapping table shown in FIG. 3 is adopted, the UE eventually selects $n_{PUCCH,2}^{(1)}$ to send b(0)b(1) =[0 1] according to the state {HARQ-ACK(0), HARQ-ACK(1), HARQ-ACK(2), HARQ-ACK(3)}= {ACK, NACK/DTX, ACK, ACK} in the mapping table.

Provided that the mapping table shown in FIG. 4 is adopted, the UE eventually selects $n_{PUCCH,3}^{(1)}$ to send b(0)b(1) =[1 1] according to the state {HARQ-ACK(0), HARQ-ACK(1), HARQ-ACK(2), HARQ-ACK(3)}= {ACK, NACK/DTX, ACK, ACK} in the mapping table.

Embodiment 2 [feedback mode determining approach 1, feedback mode 1, M=3]

As shown in FIG. 11, provided that the current base station assigns two downlink serving cells for a UE: a PCell and a SCell, and the current uplink subframe has to feed back the HARQ-ACK messages of M downlink subframes (M=3), the two ACK messages are subjected to logic AND operation and then sorted when the PDSCHs of the downlink subframes correspond to two ACK messages. It is assumed that the PDSCH of the SCell does not adopt cross-carrier scheduling, and the scheduling of PDSCH of each downlink subframe includes corresponding PDCCH. Provided that the HARQ-ACK messages of three subframes in the PCell are {ACK, ACK, NACK} and those in the SCell are {ACK, NACK, ACK} respectively, the UE will sort the HARQ-ACK messages in an ascending sequence of the DAIs corresponding to the HARQ-ACK messages of respective downlink subframes since the PCell does not include SPS subframe. In the embodiment, the sequence of subframes is accordant with that of DAIs, so the sequence of DAI is replaced with that of subframes in the following description.

It is assumed that the UE feeds back the HARQ-ACK message in format 1 b with channel selection, and the base station assigns through high-layer signaling that the UE feeds back the HARQ-ACK message in feedback mode 1 (i.e., feedback mode determining approach 1 in the disclosure).

For feedback mode 1, the UE determines the feedback state of each downlink serving cell according to the HARQ-ACK messages of M downlink subframes, specifically as shown in FIG. 12.

The HARQ-ACK messages of three subframes corresponding to the PCell are {ACK, ACK, NACK} respectively, that is to say, starting with the first subframe, there are two subframes of which the HARQ-ACK messages are ACK, and therefore, the corresponding feedback state is state 3.

The HARQ-ACK messages of two subframes corresponding to the SCell are {ACK, NACK, ACK} respectively, that is to say, starting with the first subframe, there is only one subframe of which the HARQ-ACK message is ACK, and therefore, the corresponding feedback state is state 2.

The feedback state of the PCell/SCell is mapped to {HARQ-ACK(i), HARQ-ACK(i+1)} in the mapping table in a pre-defined way, namely, state 3->{NACK/DTX, ACK}->{HARQ-ACK(0), HARQ-ACK(1)} and state 2->{ACK, NACK/DTX}->{HARQ-ACK(2), HARQ-ACK(3)}.

For the determination of corresponding PUCCH resources in the mapping table, since the UE is configured through high-layer signaling to feed back an HARQ-ACK message in feedback mode 1 in the embodiment, resource determining approach 1 will be adopted to determine the PUCCH resources, specifically as shown in embodiment 1, thereby needing no further description.

Provided that the mapping table shown in FIG. 3 is adopted, the UE eventually selects $n_{PUCCH,0}^{(1)}$ to send b(0)b(1) =[0 0] according to the state {HARQ-ACK(0), HARQ-ACK(1), HARQ-ACK(2), HARQ-ACK(3)}= {NACK/DTX, ACK, ACK, NACK/DTX} in the mapping table.

Provided that the mapping table shown in FIG. 4 is adopted, the UE eventually selects $n_{PUCCH,2}^{(1)}$ to send b(0)b(1) =[0 1] according to the state {HARQ-ACK(0), HARQ-ACK(1), HARQ-ACK(2), HARQ-ACK(3)}= {NACK/DTX, ACK, ACK, NACK/DTX} in the mapping table.

Embodiment 3 [feedback mode determining approach 1, feedback mode 1, M=4]

As shown in FIG. 13, provided that the current base station assigns two downlink serving cells for a UE: a PCell and a SCell, and the current uplink subframe has to feed back the HARQ-ACK messages of M downlink subframes (M=4), the two ACK messages are subjected to logic AND operation and then sorted when the PDSCHs of the downlink subframes correspond to two ACK messages. It is assumed that the PDSCH of the SCell does not adopt cross-carrier scheduling, and the scheduling of PDSCH of each downlink subframe includes corresponding PDCCH. Provided that the HARQ-ACK messages of four subframes in the PCell are {ACK, ACK, DTX, ACK} and those in the SCell are {ACK, ACK, ACK, ACK} respectively, since the PCell does not include SPS subframe and it can be determined that the subframe n+2 is not scheduled according to the value of the DAI, for the PCell, the HARQ-ACK messages sorted by the UE in an ascending sequence of the DAIs corresponding to the HARQ-ACK messages of respective downlink subframes are {ACK, ACK, ACK, DTX}, while for the SCell, the HARQ-ACK messages sorted by the UE in an ascending sequence of the DAIs corresponding to the HARQ-ACK messages of respective downlink subframes are accordant with those sorted in an ascending sequence of the subframes, namely, {ACK, ACK, ACK, ACK}.

It is assumed that the UE feeds back the HARQ-ACK message in format 1 b with channel selection and the base station assigns through high-layer signaling that the UE feeds back the HARQ-ACK message in feedback mode 1 (i.e., feedback mode determining approach 1 in the disclosure).

Embodiment 3-1

For feedback mode 1, the UE determines the feedback state of each downlink serving cell according to the HARQ-ACK messages of M downlink subframes, specifically as follows when the method as shown in FIG. 14 is adopted.

The sorted HARQ-ACK messages of the PCell are {ACK, ACK, ACK, DTX} respectively, that is to say, the number of messages continuously fed back as ACK from the first ACK message is 3, and therefore, the corresponding feedback state is state 3.

The sorted HARQ-ACK messages of the SCell are {ACK, ACK, ACK, ACK} respectively, that is to say, the number of messages continuously fed back as ACK from the first ACK message is 4, and therefore, the corresponding feedback state is state 4.

The obtained feedback state of the PCell/Scell is mapped to {HARQ-ACK(i), HARQ-ACK(i+1)} in a pre-defined way, namely:

state 3->{NACK/DTX, ACK}->{HARQ-ACK(0), HARQ-ACK(1)} and state 2->{ACK, ACK}->{HARQ-ACK(2), HARQ-ACK(3)}.

For the determination of corresponding PUCCH resources in the mapping table, in the embodiment, since the UE is configured to feed back an HARQ-ACK message in feedback mode 1 by high-layer signaling, resource determining approach 1 will be adopted to determine the PUCCH resources, specifically as shown in embodiment 1, thereby needing no further description.

Provided that the mapping table shown in FIG. 3 is adopted, the UE eventually selects $n_{PUCCH,1}^{(1)}$ to send b(0)b(1) =[0 1] according to the state {HARQ-ACK(0), HARQ-ACK(1), HARQ-ACK(2), HARQ-ACK(3)}= {NACK/DTX, ACK, ACK, ACK} in the mapping table.

Provided that the mapping table shown in FIG. 4 is adopted, the UE eventually selects $n_{PUCCH,1}^{(1)}$ to send b(0)b(1) =[0 0] according to the state {HARQ-ACK(0), HARQ-ACK(1), HARQ-ACK(2), HARQ-ACK(3)}= {NACK/DTX, ACK, ACK, ACK} in the mapping table.

Embodiment 3-2

For feedback mode 1, the UE determines the feedback state of each downlink serving cell according to the HARQ-ACK messages of M downlink subframes, specifically as follows when the method as shown in FIG. 15 is adopted.

The sorted HARQ-ACK messages of the PCell are {ACK, ACK, ACK, DTX} respectively, that is to say, the number of messages continuously fed back as ACK from the first ACK message is 3, and therefore, the corresponding feedback state is state 3.

The sorted HARQ-ACK messages of the SCell are {ACK, ACK, ACK, ACK} respectively, that is to say, the number of messages continuously fed back as ACK from the first ACK message is 4, and therefore, the corresponding feedback state is state 4.

The obtained feedback state of the PCell/Scell is mapped to {HARQ-ACK(i), HARQ-ACK(i+1)} in a pre-defined way, namely:

state 3->{NACK/DTX, ACK}->{HARQ-ACK(0), HARQ-ACK(1)} and state 2->{ACK, ACK}->{HARQ-ACK(2), HARQ-ACK(3)}.

For the determination of corresponding PUCCH resources in the mapping table, in the embodiment, since the UE is configured to feed back an HARQ-ACK message in feedback mode 1 by a high-layer signalling, resource determining approach 1 will be adopted to determine the PUCCH resources, specifically as shown in embodiment 1, thereby needing no further description.

Provided that the mapping table shown in FIG. 3 is adopted, the UE eventually selects $n_{PUCCH,1}^{(1)}$ to send b(0)b(1) =[0 1] according to the state {HARQ-ACK(0), HARQ-ACK(1), HARQ-ACK(2), HARQ-ACK(3)}= {NACK/DTX, ACK, ACK, ACK} in the mapping table.

Provided that the mapping table shown in FIG. 4 is adopted, the UE eventually selects $n_{PUCCH,1}^{(1)}$ to send b(0)b(1) =[0 0] according to the state {HARQ-ACK(0), HARQ-ACK(1), HARQ-ACK(2), HARQ-ACK(3)}= {NACK/DTX, ACK, ACK, ACK} in the mapping table.

In embodiment 3-2, the base station demodulates that the UE adopts $n_{PUCCH,1}^{(1)}$ to send b(0)b(1) =[0 1] (provided that the table in FIG. 3 is adopted), and the base station determines that the feedback states of the UE in the PCell may be {ACK, ACK, ACK, NACK/DTX} or {ACK, ACK, NACK/DTX, arbitrary} according to the feedback state mapping table, and thereby, the so-called state overlapping appears. For this scenario, in consideration of the stability of the system, the base station needs to re-transmit the PDSCH of the subframe corresponding to the last two ACK/NACK messages. While in embodiment 3-1, no state overlaps, and therefore, the base station can determine that the UE receives the PDSCHs of all the subframes correctly, thereby needing no retransmission.

It should be noted that although unnecessary retransmission is performed in embodiment 3-2, this does not mean that the state mapping table in FIG. 15 is worse than that in FIG. 14 since the receiving condition of each subframe is dynamically changeable. Here, state overlaps in both the two state mapping tables. In consideration of the robustness of the system, unnecessary retransmission is performed in case of state overlapping. Thus, generally speaking, the state mapping tables in FIGS. 14 and 15 should have similar performance. Therefore, whether to adopt the state mapping table in FIG. 14 or in FIG. 15 may be assigned by the base station or stipulated by the protocol, provided that it meets the agreement between the base station and the UE.

Embodiment 4 [feedback mode determining approach 2, feedback mode 1, M=4, no cross-carrier sheduling]

As shown in FIG. 13, provided that the current base station assigns two downlink serving cells for a UE: a PCell and a SCell, and the current uplink subframe has to feed back the HARQ-ACK messages of M downlink subframes (M=4), the two ACK messages are subjected to logic AND operation and then sorted when the PDSCHs of the downlink subframes correspond to two ACK messages. It is assumed that the PDSCH of the SCell does not adopt cross-carrier scheduling and the scheduling of PDSCH of each downlink subframe includes corresponding PDCCH. Provided that the HARQ-ACK messages of two subframes in the PCell are {ACK, ACK, DTX, ACK} and those in the SCell are {ACK, ACK, ACK, ACK} respectively, since the PCell does not include SPS subframe and it can be determined that the subframe n+2 is not scheduled according to the value of the DAI, for the PCell, the HARQ-ACK messages sorted by the UE in an ascending sequence of the DAIs corresponding to the HARQ-ACK messages of respective downlink subframes are {ACK, ACK, ACK, DTX}, while for the SCell, the HARQ-ACK messages sorted by the UE in an ascending sequence of the DAIs corresponding to the HARQ-ACK messages of respective downlink subframes are accordant with those sorted in an ascending sequence of the subframes, namely, {ACK, NACK, ACK, ACK}.

Provided that the UE feeds back an HARQ-ACK message in format 1b with channel selection and it is stipulated that the feedback mode used when the UE feeds back ACK/NACK in format 1 b with channel selection is determined according to whether the PDSCH from the secondary downlink serving cell is received (namely, feedback mode determining approach 2 in the disclosure), the UE will feed back the HARQ-ACK message in feedback mode 1 since the UE also detects the PDSCH in the SCell besides that in the PCell.

For feedback mode 1, the UE determines the feedback state of each downlink serving cell according to the HARQ-ACK messages of M downlink subframes, specifically as follows when the method in FIG. 14 is adopted.

The sorted HARQ-ACK messages of the PCell are {ACK, ACK, ACK, DTX} respectively, namely, the number of messages continuously fed back as ACK from the first ACK message is 3, therefore, the corresponding feedback state is state 3.

The sorted HARQ-ACK messages of the SCell are {ACK, ACK, ACK,ACK} respectively, namely, the number of messages continuously fed back as ACK from the first ACK message is 4, therefore, the corresponding feedback state is state 4.

The obtained feedback state of the PCell/Scell is mapped to {HARQ-ACK(i), HARQ-ACK(i−1)} in a pre-defined way, namely:

state 3->{NACK/DTX, ACK}->{HARQ-ACK(0), HARQ-ACK(1)}, and state 2->{ACK, ACK}->{HARQ-ACK(2), HARQ-ACK(3)}

For the determination of corresponding PUCCH resources in the mapping table, since the feedback mode when the UE feeds back the ACK/NACK in format 1 b with channel selection is determined according to the judgment result about whether the UE receives the PDSCH from the secondary downlink serving cell in the embodiment, method 2 for determining resources will be adopted to determine the PUCCH resources, specifically as follows:

$n_{PUCCH,0}^{(1)}$, $n_{PUCCH,1}^{(1)}$, $n_{PUCCH,2}^{(1)}$ and $n_{PUCCH,3}^{(1)}$ are four PUCCHs assigned by a high layer;

or, $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with an ARI in the PDCCH corresponding to the secondary downlink serving cell.

When $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with the ARI in the PDCCH corresponding to the secondary downlink serving cell, the following way is adopted:

As shown in FIG. 16, the high layer assigns four PUCCH sets each including four PUCCHs; and the ARI in PDCCH of the secondary downlink serving cell indicates the PUCCH set index and that which PUCCH in each of the four PUCCH sets corresponds to a respective one of $n_{PUCCH,0}^{(1)}$, $n_{PUCCH,1}^{(1)}$, $n_{PUCCH,2}^{(1)}$ and $n_{PUCCH,3}^{(1)}$ wherein the ARI of each subframe corresponding to the secondary downlink serving cell has the same value.

Or, as shown in FIG. 17, the high layer assigns two PUCCH sets each including four PUCCHs; the ARI of the secondary downlink serving cell in the PDCCH of the first sorted ACK message indicates which two PUCCHs in PUCCH set 1 correspond to $n_{PUCCH,0}^{(1)}$ and $n_{PUCCH,2}^{(1)}$ and the ARI of the secondary downlink serving cell in the PDCCH of the second sorted ACK message indicates which two PUCCHs in PUCCH set 2 correspond to $n_{PUCCH,1}^{(1)}$ and $n_{PUCCH,3}^{(1)}$, wherein the ARI of each subframe corresponding to the secondary downlink serving cell has the same value.

Provided that the mapping table shown in FIG. 3 is adopted, the UE eventually selects $n_{PUCCH,1}^{(1)}$ to send b(0)b(1) =[0 1] according to the state {HARQ-ACK(0), HARQ-ACK(1), HARQ-ACK(2), HARQ-ACK(3)}= {NACK/DTX, ACK, ACK, ACK} in the mapping table.

Provided that the mapping table shown in FIG. 4 is adopted, the UE eventually selects $n_{PUCCH,1}^{(1)}$ to send b(0)b(1) =[0 0] according to the state {HARQ-ACK(0), HARQ-ACK(1), HARQ-ACK(2), HARQ-ACK(3)}= {NACK/DTX, ACK, ACK, ACK} in the mapping table.

Embodiment 5 [feedback mode determining approach 2, feedback mode 1, M=4, no cross-carrier scheduling]

As shown in FIG. 13, provided that the current base station assigns two downlink serving cells for a UE: a PCell and a SCell and the current uplink subframe has to feed back the HARQ-ACK messages of M downlink subframes (M=4), the two ACK messages are subjected to logic AND operation and then sorted when the PDSCHs of the downlink subframes correspond to two ACK messages. It is assumed that the PDSCH of the SCell does not adopt cross-carrier scheduling and the scheduling of PDSCH of each downlink subframe includes corresponding PDCCH. Provided that the HARQ-ACK messages of two subframes in the PCell are {ACK, ACK, DTX, ACK} and those in the SCell are {ACK, ACK, ACK, ACK} respectively, since the PCell does not include SPS subframe and the it can be determined that the subframe n+2 is not scheduled according to the value of the DAI, for the PCell, the HARQ-ACK messages sorted by the UE in an ascending sequence of the DAIs corresponding to the HARQ-ACK messages of respective downlink subframes are {ACK, ACK, ACK, DTX}, while for the SCell, the HARQ-ACK messages sorted by the UE in an ascending sequence of the DAIs corresponding to the HARQ-ACK messages of respective downlink subframes are accordant with those sorted in an ascending sequence of the subframes, namely, {ACK, NACK, ACK, ACK}.

Provided that the UE feeds back an HARQ-ACK message in format 1b with channel selection and it is stipulated that the feedback mode when the UE feeds back the HARQ-ACK message in format 1 b with channel selection is determined according to whether the PDSCH from the secondary downlink serving cell is received (namely, feedback mode determining approach 2 in the disclosure), the UE will feed back the HARQ-ACK message in feedback mode 1 since the UE also detects the PDSCH in the SCell besides the PDSCH in the PCell.

For feedback mode 1, the UE determines the feedback state of each downlink serving cell according to the HARQ-ACK messages of M downlink subframes, specifically as follows when the method in FIG. 14 is adopted.

The sorted HARQ-ACK messages of the PCell are {ACK, ACK, ACK, DTX} respectively, namely, the number of messages continuously fed back as ACK from the first ACK message is 3, and therefore, the corresponding feedback state is state 3.

The sorted HARQ-ACK messages of the SCell are {ACK, ACK, ACK,ACK} respectively, namely, the number of messages continuously fed back as ACK from the first ACK message is 4, and therefore, the corresponding feedback state is state 4.

The obtained feedback state of the PCell/Scell is mapped to {HARQ-ACK(i), HARQ-ACK(i−1)} in a pre-defined way, namely:

state 3->{NACK/DTX, ACK}->{HARQ-ACK(0), HARQ-ACK(1)}, and state 2->{ACK, ACK}->{HARQ-ACK(2), HARQ-ACK (3)}

For the determination of corresponding PUCCH resources in the mapping table, in the embodiment, since the feedback mode when the UE feeds back an ACK/NACK message in format 1b with channel selection is determined according to whether the UE receives the PDSCH from the secondary downlink serving cell, resource determining approach 2 will be adopted to determine the PUCCH resources, specifically as follows:

$n_{PUCCH,0}^{(1)}$, $n_{PUCCH,1}^{(1)}$, $n_{PUCCH,2}^{(1)}$ and $n_{PUCCH,3}^{(1)}$ are four PUCCHs assigned by a high layer;

or, $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with an ARI in the PDCCH corresponding to the secondary downlink serving cell;

or, $n_{PUCCH,0}^{(1)}$ and $n_{PUCCH,2}^{(1)}$ and are two PUCCHs assigned by the high layer, and $n_{PUCCH,2}^{(1)}$ and $n_{PUCCH,3}^{(1)}$ are determined according to a function of the minimum (lowest) index $n_{CCE}$ of the CCE where the PDCCH corresponding to the first and the second sorted ACK messages in the secondary downlink serving cell is located (the PDCCH is sent in the primary downlink serving cell);

or, $n_{PUCCH,0}^{(1)}$ and $n_{PUCCH,1}^{(1)}$ are determined by the PUCCH assigned by the high layer in combination with an ARI in the PDCCH corresponding to the secondary downlink serving cell; and $n_{PUCCH,2}^{(1)}$ and $n_{PUCCH,3}^{(1)}$ are determined according to a function of the minimum (lowest) index $n_{CCE}$ of the CCE where the PDCCH corresponding to the first and second sorted ACK messages of the secondary downlink serving cell is located (the PDCCH is sent in the primary downlink serving cell).

When $n_{PUCCH,0}^{(1)}$, $n_{PUCCH,1}^{(1)}$, $n_{PUCCH,2}^{(1)}$ and $n_{PUCCH,3}^{(1)}$ are determined by the PUCCH assigned by the high layer in combination with the ARI in the PDCCH corresponding to the secondary downlink serving cell, its determination way is as shown in Embodiment 4.

When n $n_{PUCCH,0}^{(1)}$ and $n_{PUCCH,1}^{(1)}$ are determined by the PUCCH assigned by the high layer in combination with the ARI in the PDCCH corresponding to the secondary downlink serving cell, its determination way is accordant with the method for determining $n_{PUCCH,2}^{(1)}$ and $n_{PUCCH,3}^{(1)}$ by the PUCCH assigned by the high layer in combination with the ARI in embodiment 1, thereby needing no further description.

Provided that the mapping table shown in FIG. 3 is adopted, the UE eventually selects $n_{PUCCH,1}^{(1)}$ to send b(0)b(1) =[0 1] according to the state {HARQ-ACK(0), HARQ-ACK(1), HARQ-ACK(2), HARQ-ACK(3)}= {NACK/DTX, ACK, ACK, ACK} in the mapping table.

Provided that the mapping table shown in FIG. 4 is adopted, the UE eventually selects $n_{PUCCH,1}^{(1)}$ to send b(0)b(1) =[0 0] according to the state {HARQ-ACK(0), HARQ-ACK(1), HARQ-ACK(2), HARQ-ACK(3)}= {NACK/DTX, ACK, ACK, ACK} in the mapping table.

To realize the method embodiments, other embodiments of the disclosure further provide a UE. The following embodiments are intended to realize the method embodiments above, so the modules in the UE are arranged to realize the methods above. The module functions in the UE can be absolutely exported from the methods above, whereas, the disclosure is not limited to the following embodiments; and any devices and modules which can realize the methods above shall be included within the scope of protection of the disclosure. Moreover, in the following description, the contents same as the methods above are omitted to save space.

The disclosure provides a UE, which includes a module for determining feedback mode for HARQ-ACK message and a module for sending HARQ-ACK message according to the determined feedback mode, wherein the determining module is configured to determine the feedback mode of an HARQ-ACK message in a TDD system when an ACK/NACK message is fed back in PUCCH in format 1 b with channel selection.

When the number M of downlink subframes included in the downlink subframe window (bundling window) corresponding to an uplink subframe is equal to 1, the determining module determines that the HARQ-ACK message is fed back in the same feedback mode as that of an LTE-A FDD system; and when the number M of downlink subframe included in the downlink subframe window (bundling window) corresponding to an uplink subframe is more than 1, the determining module determines that the feedback mode when the UE feeds back an HARQ-ACK message in format 1 b with channel selection through the configuration of the high-layer signaling or according to whether the UE receives the PDSCH from the secondary downlink serving cell.

The feedback mode includes feedback mode 1 and feedback mode 2, the specific contents of which refer to the internal contents of the disclosure and what described in the method embodiments. The modules above are arranged to realize the method for sending the HARQ-ACK message provided in the disclosure. The specific technical scheme of the method can be reflected in the function of each module and the relationship between the modules, thereby needing no further description.

What said above are only the preferred embodiments of the disclosure and not intended to limit the disclosure. For those skilled in the art, various modifications and changes can be made in the disclosure. Any changes, equivalent replacements, improvements and the like made within the spirit and principle of the disclosure shall be included within the scope of protection of the disclosure.

INDUSTRIAL APPLICABILITY

With the method for sending the HARQ-ACK message in the TDD system and the UE, the UE feedbacks the HARQ-ACK message of each downlink serving cell and downlink subframe in PUCCH format 1 b with channel selection in the TDD system. Through the disclosure, the UE can feed back the HARQ-ACK message of each downlink serving cell and downlink subframe in PUCCH format 1b with channel selection in the TDD system.

The invention claimed is:

1. A method for sending a Hybrid Automatic Repeat Request Acknowledgement (HARQ-ACK) message, comprising:
when there are more than 1 downlink subframes in a downlink subframe window corresponding to an uplink subframe, determining, through high-layer signalling configuration or according to whether a User Equipment (UE) receives Physical Downlink Shared Channel (PDSCH) from a secondary downlink serving cell, a feedback mode used when the UE feeds back the HARQ-ACK message in PUCCH format 1b with channel selection,
wherein the feedback mode comprises:
feedback mode 1, in which the UE adopts an LTE-A mapping table, i.e., a mapping table, between a state combination {HARQ-ACK(i),i=0,1,2,3} of the HARQ-ACK message and a selected Physical Uplink Control Channel (PUCCH) index as well as information of two bits b(0)b(1) carried in the channel, generates the HARQ-ACK message in the mapping table in a time domain bundling manner, and determines corresponding PUCCH resources in the mapping table by using a preset PUCCH resource determining approach; and
feedback mode 2, in which the UE adopts an LTE mapping table, or the LTE-A mapping table, or an LTE or LTE-A mapping table assigned by the high layer signalling, generates the HARQ-ACK message in the mapping table by using an HARQ-ACK generating approach in an HARQ-ACK multiplexing mode of an LTE system, and determines the corresponding PUCCH resources in the mapping table by using a PUCCH resource determining approach in the HARQ-ACK multiplexing mode of the LTE system,
wherein the determining the feedback mode through the high-layer signaling configuration comprises:
if the high-layer signaling is feedback mode selection signaling, determining the feedback mode by the UE according to the received high-layer signaling; or,
if the high-layer signaling is a carrier aggregation signaling, adopting feedback mode 1 for feedback when a plurality of serving cells are configured for the UE, and adopting feedback mode 2 for feedback when only one serving cell is configured for the UE.

2. The method according to claim 1, wherein the determining the feedback mode according to whether the UE receives the PDSCH from the secondary downlink serving cell comprises:
when the UE receives the PDSCH from the secondary downlink serving cell, performing feedback in feedback mode 1 by the UE; otherwise, performing feedback in feedback mode 2 by the UE, which is same as when the UE only receives the PDSCH from a primary downlink serving cell and/or receives downlink control information indicating downlink semi-static persistent scheduling release, performing feedback in feedback mode 2 by the UE; otherwise, performing feedback in feedback mode 1 by the UE.

3. The method according to claim 1, wherein in feedback mode 1, the generating the HARQ-ACK message in the mapping table by the UE in the time domain bundling manner comprises:
for each downlink serving cell, obtaining a feedback state of each downlink serving cell by the UE according to the HARQ-ACK messages of M downlink subframes, M being a number of downlink subframes comprised in the downlink subframe window corresponding to one uplink subframe, which is determined according to uplink and downlink subframe configuration, M=2, 3 or 4, and there are 2 downlink serving cells; and
mapping the obtained feedback state of each downlink serving cell to {HARQ-ACK(i), HARQ-ACK(i+1)} in the mapping table in a preset manner, so as to obtain the HARQ-ACK message in the mapping table, where i=0, 2.

4. The method according to claim 3, wherein when M=2, the UE obtains the feedback state of each downlink serving cell according to the following correspondence between the HARQ-ACK message and the feedback state of the downlink serving cell:

for feedback state 1, the HARQ-ACK messages of both the first and second downlink subframes are negative acknowledgement (NACK) or discontinuous transmission (DTX);

for feedback state 2, the HARQ-ACK message of the first downlink subframe is ACK and that of the second downlink subframe is NACK or DTX;

for feedback state 3, the HARQ-ACK message of the first downlink subframe is NACK or DTX and that of the second downlink subframe is ACK; and for feedback state 4, the HARQ-ACK messages of both the downlink subframes are ACK.

5. The method according to claim 3, wherein when M=3 or 4, the obtaining the feedback state of each downlink serving cell by the UE according to the HARQ-ACK message of M downlink subframes comprises:

firstly, sorting the HARQ-ACK messages by the UE in an ascending sequence of Downlink Assignment Index (DAI) values corresponding to the HARQ-ACK message of each downlink subframe, the HARQ-ACK message without DAI being sorted prior to that with DAI; and then mapping a number of the messages in the sorted HARQ-ACK messages which are continuously fed back as ACK starting from the first HARQ-ACK message to the feedback state of a corresponding downlink serving cell, when the PDSCH of the downlink subframe corresponds to two HARQ-ACK messages, the two HARQ-ACK messages being subjected to logic AND operation and then sorted.

6. The method according to claim 5, wherein when M=3, the UE obtains the feedback state of each downlink serving cell according to the following correspondence relationship between the HARQ-ACK message and the feedback state of the downlink serving cell:

feedback state 1 corresponds to that after sorting, a first HARQ-ACK message is NACK or DTX and other HARQ-ACK messages are arbitrary;

feedback state 2 corresponds to that after sorting, the first HARQ-ACK message is ACK, a second sorted HARQ-ACK message is NACK or DTX and the other HARQ-ACK message is arbitrary;

feedback state 3 corresponds to that after sorting, first two sorted HARQ-ACK messages are ACK and a third HARQ-ACK message is NACK or DTX; and feedback state 4 corresponds to that after sorting, three HARQ-ACK messages are all ACK.

7. The method according to claim 5, wherein when M=4, the UE obtains the feedback state of each downlink serving cell according to the following correspondence between the HARQ-ACK message and the feedback state of the downlink serving cell:

feedback state 1 corresponds to that after sorting, a first HARQ-ACK message is NACK or DTX and other HARQ-ACK messages are arbitrary;

feedback state 2 corresponds to that after sorting, the first HARQ-ACK message is ACK, a second sorted HARQ-ACK message is NACK or DTX and other ACK/NACK messages are arbitrary;

feedback state 3 corresponds to that after sorting, first two sorted HARQ-ACK messages are both ACK and a third HARQ-ACK message is NACK or DTX, and other HARQ-ACK messages are arbitrary, or, first three HARQ-ACK messages are ACK, a fourth HARQ-ACK message is NACK or DTX; and feedback state 4 corresponds to that after sorting, four HARQ-ACK messages are all ACK;

or, feedback state 1 corresponds to that after sorting, the first HARQ-ACK message is NACK or DTX; or, the first ACK/NACK message is ACK and the second HARQ-ACK message is NACK or DTX; and other HARQ-ACK messages are arbitrary;

feedback state 2 corresponds to that after sorting, the first two HARQ-ACK messages are ACK, the third HARQ-ACK message is NACK or DTX and other HARQ-ACK messages are arbitrary;

feedback state 3 corresponds to that after sorting, the first three HARQ-ACK messages are ACK and the fourth HARQ-ACK message is NACK or DTX; and feedback state 4 corresponds to that after sorting, the four HARQ-ACK messages are all ACK.

8. The method according to claim 3, wherein the mapping the obtained feedback state of each downlink serving cell to {HARQ-ACK(i), HARQ-ACK(i+1)} in the mapping table in a preset mode to obtain the HARQ-ACK message in the mapping table comprises:

mapping feedback state 1 to {NACK/DTX, NACK/DTX};

mapping feedback state 2 to {ACK, NACK/DTX};

mapping feedback state 3 to {NACK/DTX, ACK};

mapping feedback state 4 to {ACK, ACK}; and mapping the feedback state of the primary downlink serving cell to HARQ-ACK(0), HARQ-ACK(1) and mapping the feedback state of the secondary downlink serving cell to HARQ-ACK(2), HARQ-ACK(3).

9. The method according to claim 1, wherein if it is determined that the feedback mode used when the UE feeds back the ACK/NACK message in PUCCH format 1b with channel selection is feedback mode 1 through the high-layer signalling configuration, the determining the corresponding PUCCH resources in the mapping table by a preset PUCCH resource determining approach comprises:

assigning $n_{PUCCH,0}^{(1)}, n_{PUCCH,1}^{(1)}, n_{PUCCH,2}^{(1)}$ and $n_{PUCCH,3}^{(1)}$ as four PUCCHS by a high layer;

or, determining $n_{PUCCH,0}^{(1)}$ and $n_{PUCCH,1}^{(1)}$ according to PUCCH resources corresponding to the HARQ-ACK messages corresponding to the first and second downlink subframes or first and second sorted HARQ-ACK messages in the primary downlink serving cell;

assigning $n_{PUCCH,2}^{(1)}$ and $n_{PUCCH,3}^{(1)}$ as two PUCCHs by the high layer, or, determining $n_{PUCCH,2}^{(1)}$ and $n_{PUCCH,3}^{(1)}$ according to PUCCHs assigned by the high layer in combination with a Resource Allocation Indicator (ARI) in the PDCCH of the corresponding downlink subframe in the secondary downlink serving cell; or, when the PDSCH in the secondary downlink serving cell adopts cross-carrier scheduling, implicitly determining $n_{PUCCH,2}^{(1)}$ and $n_{PUCCH,3}^{(1)}$ according to the PDCCHs corresponding to the HARQ-ACK messages corresponding to the first and second downlink subframes or the first and second sorted HARQ-ACK messages in the secondary downlink cell.

10. The method according to claim 9, wherein the determining $n_{PUCCH,0}^{(1)}$ and $n_{PUCCH,1}^{(1)}$ according to the PUCCH resources corresponding to the HARQ-ACK message corresponding to the first and second downlink subframes or the first and second sorted HARQ-ACK messages in the primary downlink serving cell comprises:

when the PDSCH corresponding to the HARQ-ACK message has a corresponding PDCCH, the implicitly determining $n_{PUCCH,0}^{(1)}$ and $n_{PUCCH,1}^{(1)}$ according to the PDCCH comprises: determining $n_{PUCCH,0}^{(1)}$ and $n_{PUCCH,1}^{(1)}$ according to a function of a minimum index $n_{CCE}$ of a Control Channel Element (CCE) where the PDCCH is located; and when the PDSCH corresponding to the HARQ-ACK message does not have corresponding PDCCH, namely, the PDSCH is a Semi Persistent Scheduling (SPS) PDSCH, determining $n_{PUCCH,0}^{(1)}$ and $n_{PUCCH,1}^{(1)}$ according to the PUCCH resources assigned by the high layer and a Transmission Power Control (TPC) command in Downlink Control Information (DCI) when the SPS PDSCH is active.

11. The method according to claim 9, wherein the determining $n_{PUCCH,2}^{(1)}$ and $n_{PUCCH,3}^{(1)}$ by the PUCCH assigned by the high layer in combination with the ARI in the PDCCH of the corresponding downlink subframe in the secondary downlink serving cell comprises:

assigning two PUCCH sets by the high layer, each comprising four PUCCHs, one PUCCH set including PUCCH resources corresponding to $n_{PUCCH,2}^{(1)}$ and the other PUCCH set including PUCCH resources corresponding to $n_{PUCCH,3}^{(1)}$ and determining the corresponding PUCCH resources of $n_{PUCCH,2}^{(1)}$ and $n_{PUCCH,3}^{(1)}$ in their respective sets according to the ARI, the ARI of each subframe in the secondary downlink serving cell having the same value;

or, assigning one PUCCH set by the high layer, which set comprises four PUCCHs, and determining which two PUCCH resources in the set correspond to $n_{PUCCH,2}^{(1)}$ and $n_{PUCCH,3}^{(1)}$ according to the ARI, the ARI of each subframe in the secondary downlink serving cell having the same value;

or, assigning two PUCCH sets by the high layer, each PUCCH set comprising four PUCCHs, determining which PUCCH in PUCCH set 1 corresponds to $n_{PUCCH,2}^{(1)}$ according to the ARI in the PDCCH corresponding to the HARQ-ACK message corresponding to the first downlink subframe or the first sorted HARQ-ACK message in the secondary downlink serving cell, and determining which PUCCH in PUCCH set 2 corresponds to $n_{PUCCH,3}^{(1)}$ according to the ARI in the PDCCH corresponding to the HARQ-ACK message corresponding to the second downlink subframe or the second sorted HARQ-ACK message in the secondary downlink serving cell;

or, assigning one PUCCH set by the high layer, which set comprises four PUCCHs, indicating which PUCCH in the PUCCH set corresponds to $n_{PUCCH,2}^{(1)}$ by the ARI in the PDCCH corresponding to the HARQ-ACK message corresponding to the first downlink subframe or the first sorted HARQ-ACK message in the secondary downlink serving cell, and indicating which of other PUCCHs in the PUCCH set corresponds to $n_{PUCCH,3}^{(1)}$ by the ARI in the PDCCH corresponding to the the HARQ-ACK message corresponding to the second downlink subframe or the second sorted HARQ-ACK message in the secondary downlink serving cell, wherein the ARIs corresponding to the HARQ-ACK message of the first and second downlink subframes or the first and the second sorted HARQ-ACK messages in the secondary downlink serving cell having different values.

12. The method according to claim 1, wherein if it is determined that the feedback mode used when the UE feeds back the ACK/NACK message in PUCCH format 1b with channel selection is feedback mode 1 according to whether the UE receives the PDSCH from the secondary downlink serving cell, the determining the corresponding PUCCH resources in the mapping table by a preset PUCCH resource determining approach comprises:

assigning $n_{PUCCH,0}^{(1)}$, $n_{PUCCH,1}^{(1)}$, $n_{PUCCH,2}^{(1)}$ and $n_{PUCCH,3}^{(1)}$ as four PUCCHs by the high layer;

or, determining $n_{PUCCH,0}^{(1)}$, $n_{PUCCH,1}^{(1)}$, $n_{PUCCH,2}^{(1)}$ and $n_{PUCCH,3}^{(1)}$ by the PUCCH assigned by the high layer in combination with an ARI in the corresponding PDCCH in the secondary downlink serving cell;

or, when the downlink configuration information PDCCH of PDSCH of the secondary downlink serving cell is not sent in the primary downlink serving cell, assigning $n_{PUCCH,0}^{(1)}$, $n_{PUCCH,1}^{(1)}$, $n_{PUCCH,2}^{(1)}$ and $n_{PUCCH,3}^{(1)}$ as four PUCCHs by the high layer, and when the PDSCH of the secondary downlink serving cell adopts cross-carrier scheduling, assigning $n_{PUCCH,0}^{(1)}$, and $n_{PUCCH,1}^{(1)}$, as two PUCCHs by the high layer, and determining $n_{PUCCH,2}^{(1)}$ and $n_{PUCCH,3}^{(1)}$ according to a function of a minimum index $n_{CCE}$ of a CCE where the PDCCH corresponding to the HARQ-ACK messages corresponding to the first and second downlink subframes or the first and second sorted HARQ-ACK messages in the secondary downlink serving cell is located;

or, when the downlink configuration information PDCCH of PDSCH of the secondary downlink serving cell is not sent in the primary downlink serving cell, determining $n_{PUCCH,0}^{(1)}$, $n_{PUCCH,1}^{(1)}$, $n_{PUCCH,2}^{(1)}$ and $n_{PUCCH,3}^{(1)}$ by the PUCCH assigned by the high layer in combination with the ARI in the PDCCH corresponding to the secondary downlink serving cell; while when the PDSCH of the secondary downlink serving cell adopts cross-carrier scheduling, determining $n_{PUCCH,0}^{(1)}$ and $n_{PUCCH,1}^{(1)}$ by the PUCCH assigned by the high layer in combination with the ARI in the PDCCH corresponding to the secondary downlink serving cell and determining $n_{PUCCH,2}^{(1)}$ and $n_{PUCCH,3}^{(1)}$ according to the function of the least index $n_{CCE}$ of the CCE where the PDCCH corresponding to the HARQ-ACK messages corresponding to the first and second downlink subframes or the first and second sorted HARQ-ACK messages in the secondary downlink serving cell is located.

13. The method according to claim 12, wherein the determining $n_{PUCCH,0}^{(1)}$, $n_{PUCCH,1}^{(1)}$, $n_{PUCCH,2}^{(1)}$, and $n_{PUCCH,3}^{(1)}$ by the PUCCH assigned by the high layer in combination with the ARI in the PDCCH corresponding to the secondary downlink serving cell specifically comprises:

assigning four PUCCH sets by the high layer, each set comprising four PUCCHs, and indicating the PUCCH set index by the ARI in PDCCH of the secondary downlink serving cell, each of $n_{PUCCH,0}^{(1)}$, $n_{PUCCH,1}^{(1)}$, $n_{PUCCH,2}^{(1)}$ and $n_{PUCCH,3}^{(1)}$ corresponds to one PUCCH in the four PUCCH sets, the ARI of each subframe corresponding to the secondary downlink serving cell having the same value;

or, assigning two PUCCHs by the high layer, each set comprising four PUCCHs, indicating which two PUCCHs in PUCCH set 1 correspond to $n_{PUCCH,0}^{(1)}$ and $n_{PUCCH,2}^{(1)}$ by the ARI in the PDCCH corresponding to the HARQ-ACK message corresponding to the first downlink subframe or the first sorted HARQ-ACK message in the secondary downlink serving cell, and indicating which two PUCCHs in PUCCH set 2 correspond to $n_{PUCCH,1}^{(1)}$ and $n_{PUCCH,3}^{(1)}$ by the ARI in the PDCCH corresponding to the HARQ-ACK message corresponding to the second downlink subframe or the second sorted HARQ-ACK message in the secondary downlink serving cell.

14. The method according to claim 12, wherein the determining $n_{PUCCH,0}^{(1)}$ and $n_{PUCCH,1}^{(1)}$ by the PUCCH assigned by the high layer in combination with the ARI in the PDCCH corresponding to the secondary downlink serving cell comprises:

assigning one PUCCH set by the high layer, which set comprises four PUCCHs, and determining which two PUCCH resources in the set correspond to $n_{PUCCH,0}^{(1)}$ and $n_{PUCCH,1}^{(1)}$ according to the ARI, the ARI of each subframe corresponding to the secondary downlink serving cell having the same value;

or, assigning two PUCCHs by the high layer, each set comprising four PUCCHs, indicating which PUCCH in PUCCH set 1 corresponds to $n_{PUCCH,0}^{(1)}$ by the ARI in the PDCCH corresponding to the HARQ-ACK message corresponding to the first subframe or the first sorted HARQ-ACK message in the secondary downlink serving cell, and indicating which PUCCH in PUCCH set 2 corresponds to $n_{PUCCH,1}^{(1)}$ by the ARI in the PDCCH corresponding to the HARQ-ACK message corresponding to the second subframe or the second sorted HARQ-ACK message in the secondary downlink serving cell;

or, assigning one PUCCH set by the high layer, which set comprises four PUCCHs, indicating which PUCCH in the PUCCH set corresponds to $n_{PUCCH,0}^{(1)}$ by the ARI in the PDCCH corresponding to the HARQ-ACK message corresponding to the first downlink subframe or the first sorted HARQ-ACK message in the secondary downlink serving cell, and indicating which of other PUCCHs in the PUCCH set corresponds to $n_{PUCCH,1}^{(1)}$ by the ARI in the PDCCH corresponding to the HARQ-ACK message corresponding to the second downlink subframe or the second sorted HARQ-ACK message in the secondary downlink serving cell, the ARIs corresponding to the HARQ-ACK messages of the first and second downlink subframes or the first and second sorted HARQ-ACK messages in the secondary downlink serving cell having different values.

15. A User Equipment (UE), comprising a determining module, which is configured to determine a feedback mode used when the UE feeds back an HARQ-ACK message in PUCCH format 1b with channel selection, through high layer configuration or according to whether the UE receives PDSCH from a secondary downlink serving cell when a number M of downlink subframes comprised in a downlink subframe window corresponding to an uplink subframe is more than 1, wherein the feedback mode comprises feedback mode 1 and feedback mode 2;

feedback mode 1, in which the UE adopts a mapping correspondence table, i.e., mapping table, between state combination {HARQ-ACK(i),i=0,1,2,3} of the HARQ-ACK message defined by LTE-A and a selected Physical Uplink Control Channel (PUCCH) index as well as information of two bits b(0)b(1) carried in the channel, generates the HARQ-ACK message in the mapping table in a time domain bundling manner, and determines corresponding PUCCH resources in the mapping table by using a preset PUCCH resource determining approach; and feedback mode 2, in which the UE adopts a mapping table defined by LTE or the LTE-A or the mapping table defined for the LTE or the LTE-A by the high-layer signalling configuration, generates the HARQ-ACK message in the mapping table by using an HARQ-ACK generating approach in an HARQ-ACK multiplexing mode of an LTE system, and determines the corresponding PUCCH resources in the mapping table by using a PUCCH resource determining approach in the HARQ-ACK multiplexing mode of the LTE system, wherein in the case that the determining module determines the feedback mode through the high-layer signaling configuration, if the high-layer signaling is feedback mode selection signaling, the determining module determines the feedback mode according to the received high-layer signaling; or, if the high-layer signaling is a carrier aggregation signaling, the determining module determines that feedback mode 1 is adopted for feedback when a plurality of serving cells are configured for the UE, and feedback mode 2 is adopted for feedback when only one serving cell is configured for the UE.

16. The UE according to claim 15, wherein in the case that the determining module determines the feedback mode according to whether the UE receives the PDSCH from the secondary downlink serving cell, when the UE receives the PDSCH from the secondary downlink serving cell, the UE performs feedback in feedback mode 1; otherwise, performs feedback in feedback mode 2, which is same as when the UE only receives the PDSCH from a primary downlink serving cell and/or receives downlink control information indicating downlink semi-static persistent scheduling release, the UE performs feedback in feedback mode 2; otherwise, performs feedback in feedback mode 1.

17. An evolved Node B (eNB), comprising a configuration module, which is arranged to configure a feedback mode for a UE to feed back an HARQ-ACK message in PUCCH format 1b with channel selection when a number M of downlink subframes comprised in a downlink subframe window corresponding to an uplink subframe is more than 1, wherein the feedback mode comprises:

feedback mode 1, in which the UE adopts a mapping correspondence table, i.e., mapping table, between state combination {HARQ-ACK(i),i=0,1,2,3} of the HARQ-ACK message defined by LTE-A and a selected Physical Uplink Control Channel (PUCCH) index as well as information of two bits b(0)b(1) carried in the channel, generates the HARQ-ACK message in the mapping table in a time domain bundling manner, and determines corresponding PUCCH resources in the mapping table by using a preset PUCCH resource determining approach; and feedback mode 2, in which the UE adopts a mapping table defined by LTE or the LTE-A or the mapping table defined for the LTE or the LTE-A by the high-layer signalling configuration, generates the HARQ-ACK message in the mapping table by using an HARQ-ACK generating approach in an HARQ-ACK multiplexing mode of an LTE system, and determines the corresponding PUCCH resources in the mapping table by using a PUCCH resource determining approach in the HARQ-ACK multiplexing mode of the LTE system.

* * * * *